US012530394B2

(12) United States Patent
Chakiat et al.

(10) Patent No.: US 12,530,394 B2
(45) Date of Patent: Jan. 20, 2026

(54) GENERATING PERSONALIZED CONTENT FOR PRESENTATION ON USER DEVICES

(71) Applicant: GLANCE INMOBI PTE. LTD, Singapore (SG)

(72) Inventors: Abhijith Chakiat, Bengaluru (IN); Amish Faridally Patel, Mumbai (IN); Ian Anderson, Usk (GB); Kunal Kishore, Ranchi (IN); Ritesh Ramnarayan Pallod, Bengaluru (IN); Paul Anthony Duff, Vilniaus. r. sav. (LT); Amil Khare, Bengaluru (IN); Michael Ronan McCarthy, Headingly (CA)

(73) Assignee: Glance InMobi PTE. LTD, Singapore (SG)

( * ) Notice: Subject to any disclaimer, the term of this patent is extended or adjusted under 35 U.S.C. 154(b) by 265 days.

(21) Appl. No.: 18/146,353

(22) PCT Filed: Jun. 25, 2021

(86) PCT No.: PCT/IB2021/055704
§ 371 (c)(1),
(2) Date: Dec. 23, 2022

(87) PCT Pub. No.: WO2021/260650
PCT Pub. Date: Dec. 30, 2021

(65) Prior Publication Data
US 2025/0077568 A1 Mar. 6, 2025

(51) Int. Cl.
*G06F 16/438* (2019.01)
*G06F 16/435* (2019.01)
(Continued)

(52) U.S. Cl.
CPC .......... *G06F 16/438* (2019.01); *G06F 16/435* (2019.01); *G06F 16/9558* (2019.01); *G06T 11/60* (2013.01)

(58) Field of Classification Search
CPC .. G06F 16/438; G06F 16/435; G06F 16/9558; G06T 11/60
(Continued)

(56) References Cited

U.S. PATENT DOCUMENTS 9,959,009 B1 * 5/2018 Duman ................. G06F 1/3265
2002/0036632 A1 * 3/2002 Kuriyama .......... H04N 1/00442
345/473
(Continued)

OTHER PUBLICATIONS

PCT Written Opinion and International Search Report from the International Searching Authority filed in PCT/IB2021/055704 dated Sep. 29, 2021, pp. 1-11.

*Primary Examiner* — Phong H Nguyen

(57) ABSTRACT

Provided is a system and method for digital content generation and recommendation. A first plurality of stories are collected from various content sources over a network. A second plurality of stories are selected from the first plurality of stories such that a degree of similarity between any two stories of the second plurality of stories is below a determined threshold. A summary and a headline are generated for a first story of the second plurality of stories. A set of images are selected, from an image database, for the first story based on the generated summary and headline. A multimedia item including the summary, the headline, and a first image of the set of images is created. The multimedia item is presented on a lock screen interface of a user device, displaying the generated summary, the generated headline, and the first image on the lock screen interface.

20 Claims, 11 Drawing Sheets

(51) Int. Cl.
*G06F 16/955* (2019.01)
*G06T 11/60* (2006.01)

(58) Field of Classification Search
USPC .................. 707/722, 723, 736, 758, 769
See application file for complete search history.

(56) References Cited

U.S. PATENT DOCUMENTS

| | | | |
|---|---|---|---|
| 2005/0203970 A1* | 9/2005 | McKeown | G06Q 10/10 707/999.203 |
| 2016/0323643 A1* | 11/2016 | Panchaksharaiah | H04N 21/4753 |
| 2017/0091154 A1* | 3/2017 | Eppolito | G06V 20/30 |
| 2019/0325084 A1* | 10/2019 | Peng | G06F 3/013 |
| 2020/0387708 A1* | 12/2020 | Candelore | G06V 10/60 |
| 2021/0035025 A1* | 2/2021 | Kalluri | G06F 18/24137 |

* cited by examiner

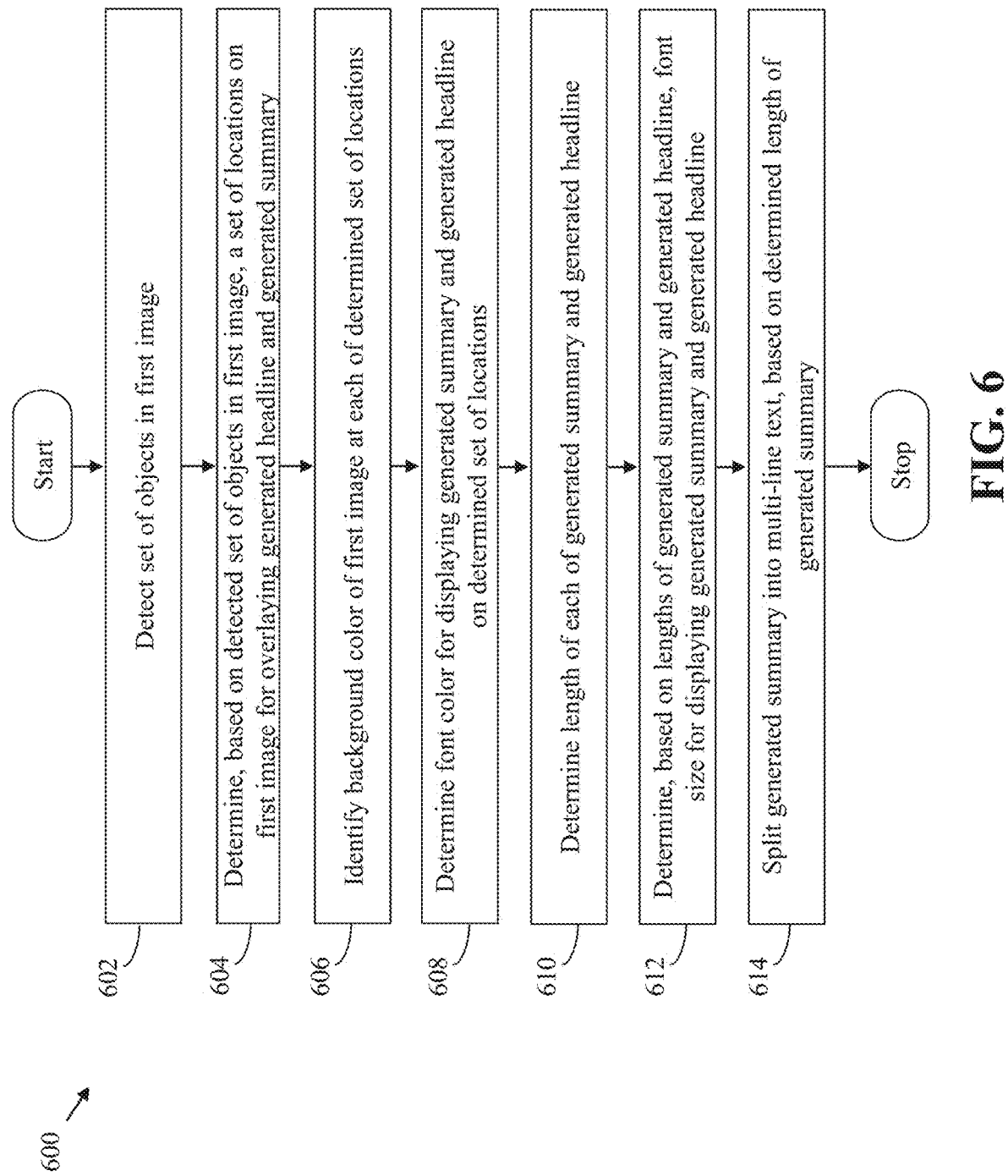

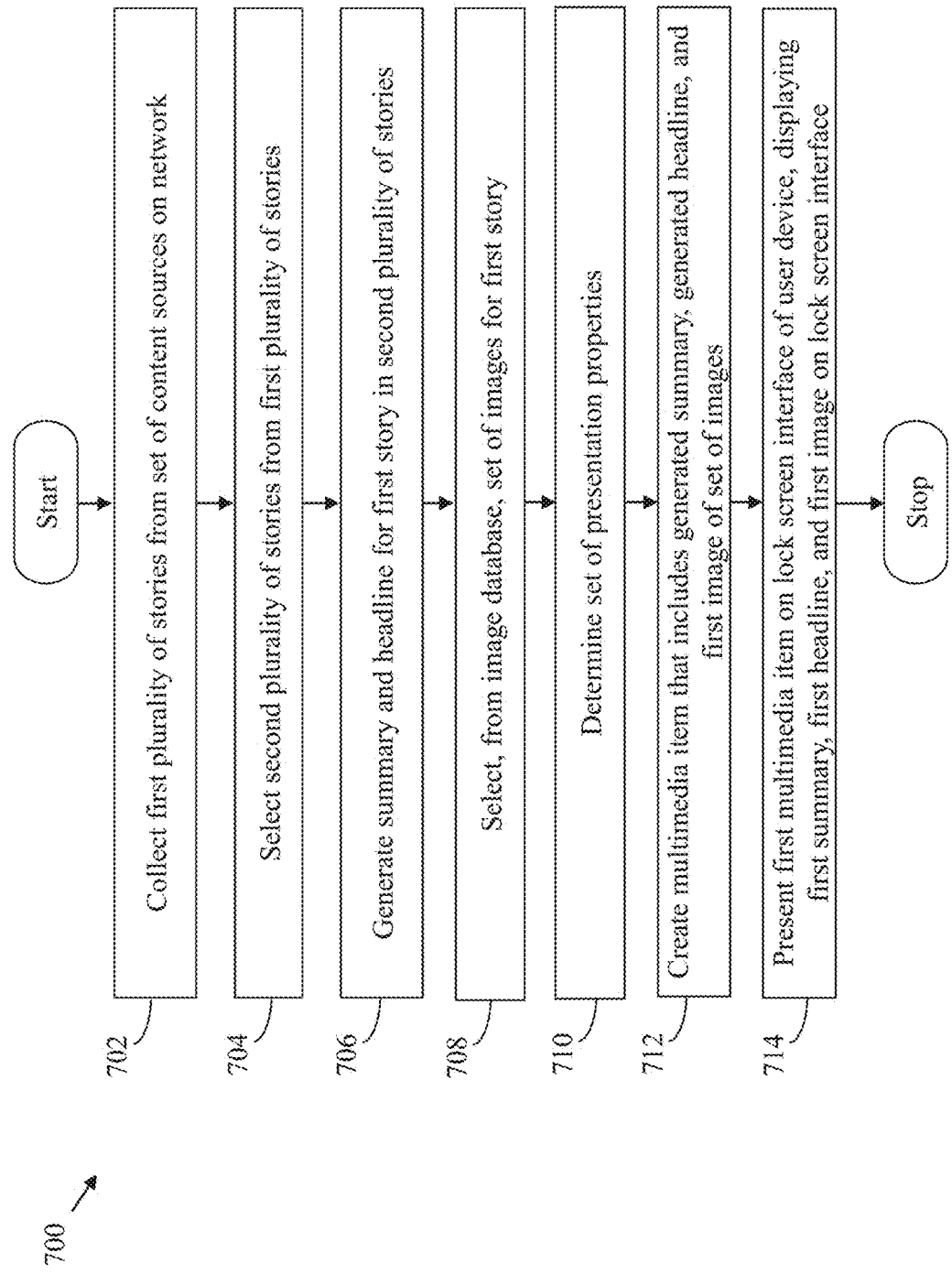

GENERATING PERSONALIZED CONTENT FOR PRESENTATION ON USER DEVICES

CROSS-RELATED APPLICATIONS

This application claims priority of Indian Application No. 202041027370, filed Jun. 27, 2021, the contents of which are incorporated herein by reference.

FIELD

Various embodiments of the present disclosure relate generally to content recommendation. More particularly, various embodiments of the present disclosure relate to a method and system for generating personalized digital content and presentation on user devices.

BACKGROUND

Advancements in technology have led to proliferation of personal devices, such as smartphones, tablets, smart watches, laptops, or the like. Most users today carry a smartphone. In addition to facilitating communication, personal devices (e.g., smartphones) allow users to engage in various activities such as networking on social media, shopping on e-commerce websites, playing video games, browsing the web, or the like.

A user may also use a smartphone to view digital content pertaining to various domains such as current affairs, sports news, gadget news, or the like. Such digital content is typically hosted by websites or blogs on the web. The user may view such content by accessing an application (e.g., a standalone application or a web application) on the smartphone. In most scenarios, the application may be generic in nature, including multiple sections (e.g., sports, entertainment, opinion editorials, or the like) therein. In today's fast-paced world, such applications with a generic interface prove cumbersome, requiring users to open applications and search for preferred categories of stories or news articles.

Application developers attempt to solve this problem by providing push notifications on personal devices. A push notification is a message or an alert sent to a personal device (e.g., a smartphone) by an application installed on the personal device. Examples of push notifications which may include, but are not limited to, marketing offers, news alerts, weather updates, or the like. However, the push notifications are not tailor made or curated as per individual user preferences. For example, a single push notification pertaining to a news event may be provided to various users on corresponding personal devices (e.g., millions of personal devices) with no regard to preferences of the various users. Users tend to ignore such generic push notifications, resulting in poor rates of engagement.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Methods for generating personalized content for presentation on user devices are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 6 represents a flowchart that illustrates a method for determining a layout for displaying a generated summary, a generated headline, and a set of images on a multimedia item, in accordance with an exemplary embodiment of the present disclosure;

FIG. 7 represents a high-level flowchart that illustrates a method for generating personalized content for presentation on the user device, in accordance with an exemplary embodiment of the present disclosure.

DETAILED DESCRIPTION

Figure 1:
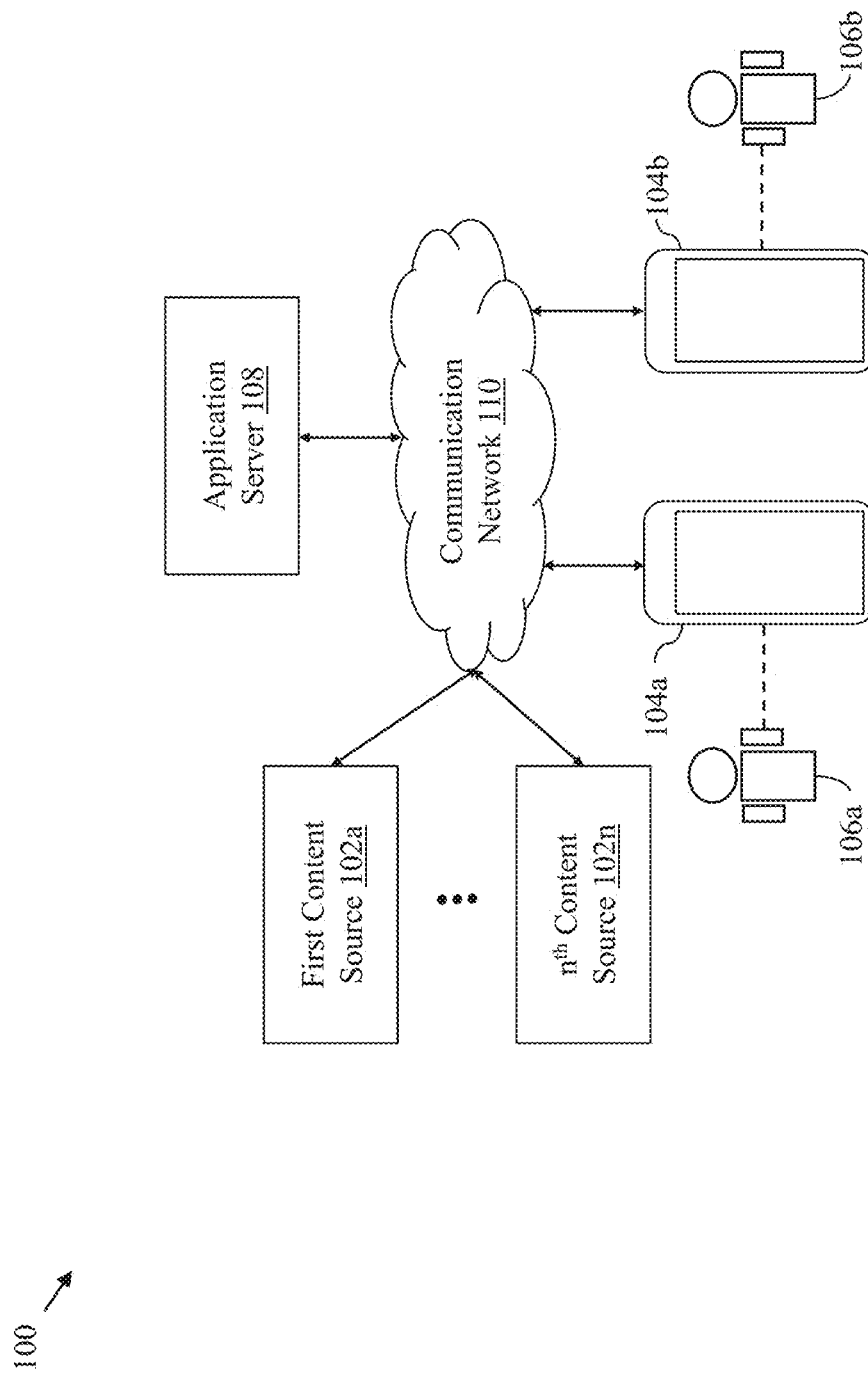
FIG. 1 is a block diagram that illustrates an exemplary environment for generating personalized content for presentation on user devices, in accordance with an exemplary embodiment of the present disclosure.

Certain embodiments of the disclosure may be found in the disclosed systems and methods for generating personalized content for presentation on user devices. Exemplary aspects of the disclosure provide methods for generating personalized content for presentation on user devices. The methods include various operations that are executed by a server (for example, an application server) to automatically generate personalized content using artificial intelligence models for presentation on user devices. In an embodiment, the server is configured to collect a first plurality of stories from a plurality of content sources on a network. The server is configured to extract from each of the first plurality of stories, a set of textual elements. The set of textual elements extracted from each of the first plurality of stories includes at least one of a title, a description, a category, and a language of a corresponding story. The server is configured to determine a degree of similarity between stories of the first plurality of stories based on the set of textual elements extracted from each of the first plurality of stories. The server is configured to segregate the first plurality of stories into a set of groups based on the determined degree similarity between the stories of the first plurality of stories. The degree of similarity between any two stories segregated into the same group is above a determined threshold and the degree of similarity between any two stories segregated into different groups is below the determined threshold. In other words, duplicate stories are segregated into the same group, while unique stories are segregated into different groups. The server is configured to select a second plurality of stories from the first plurality of stories such that the selection of the second plurality of stories include selecting one story from each of the set of groups. The server is configured to assign a score to each of the second plurality of stories based on an interaction history of a plurality of users with a set of multimedia items previously presented on a plurality of user devices of the plurality of users. The server ranks the second plurality of stories in an order based on the score assigned to each story of the second plurality of story. The server selects a first story of the second plurality of stories for multimedia item creation based on the ranking of the second plurality of stories.

The server is configured to automatically generate a summary and a headline for the selected first story by using artificial intelligence (AI) models. The server is further configured to select, from a plurality of images stored in an image database, a set of images for the first story based on the generated summary and the generated headline. The server is further configured to determine a set of presentation properties. The set of presentation properties includes at least one of a font style and a layout for displaying the generated summary, the generated headline, and the selected set of images. The determination of the font style is based on at least one of a category, a topic, and a language associated with the first story. The server is configured to create, based on the determined set of presentation properties, a multimedia item that includes the generated summary, the generated headline, and a first image of the set of images. The server is further configured to identify a set of user preferences associated with a user device. The set of user preferences includes a preferred category, a preferred topic, or a preferred language. When at least one of the category, the topic, and the language associated with the first story corresponds to the set of user preferences, the server is configured to present the created multimedia item on a lock screen interface of the user device, displaying the generated summary, the generated headline, and the first image on the lock screen interface in accordance with the determined set of presentation properties. The multimedia item further includes a hyperlink to the first story. Upon selection of the hyperlink by a user of the user device, the first story is presented on the user device.

In some embodiments of the present disclosure, the server is further configured to train a machine learning model for summary generation. The machine learning model is trained based on a training dataset including a description of each of a set of sample stories and a summary of each of the set of sample stories. The server is further configured to provide as input to the trained machine learning model, a description of the first story such that the summary for the first story is generated based on an output of the trained machine learning model for the inputted description of the first story.

In some embodiments of the present disclosure, the server is further configured to train another machine learning model for headline generation. The machine learning model is trained based on another training dataset including a description of each of the set of sample stories, and a headline of each of the set of sample stories. The server is further configured to provide as input to the trained machine learning model, a description of the first story, such that the headline for the first story is generated based on an output of the trained machine learning model for the inputted description of the first story.

In some embodiments of the present disclosure, each image of the plurality of images stored in the image database is associated with a set of keywords, such that the selection of the set of images for the first story is further based on a degree of similarity between the set of keywords, associated with each of the plurality of images, and the generated summary or the generated headline.

In some embodiments of the present disclosure, the server is further configured to select a second image from the set of images and update the multimedia item by replacing the first image included in the multimedia item with the second image. After a defined time-interval, the updated multimedia item is presented on the lock screen interface of the user device, displaying the generated summary, the generated headline, and the second image on the lock screen interface.

In some embodiments of the present disclosure, the server is further configured to identify, based on a set of image processing techniques, a set of objects in the first image. The server is further configured to determine, based on the detected set of objects in the first image, a set of locations on the first image for overlaying the generated headline and the generated summary. The server is further configured to identify a background color of the first image at each of the determined set of locations. The server is further configured to determine a font color for displaying the generated summary and the generated headline on the determined set of locations. The determined font color and the determined set of locations constitute the layout for displaying the generated summary, the generated headline, and the set of images.

In some embodiments of the present disclosure, the server is further configured to determine a length of each of the generated summary and the generated headline. The determination of the lengths of the generated summary and the generated headline is based on a count of characters in the generated summary and the generated headline, respectively. The server is further configured to determine based on the lengths of the generated summary and the generated headline, a font size for displaying each of the generated summary and the generated headline on the determined set of locations. The server is further configured to split the generated summary into multi-line text based on the determined length of the generated summary. The determined font size and the multi-line text further constitute the layout for displaying the generated summary, the generated headline, and the set of images The present disclosure discloses utilizing an interaction history of previously presented multimedia items and user preferences associated with a user device, to present personalized multimedia content on a lock screen interface of the user device. The personalized multimedia content (i.e., a multimedia item) is generated without any manual intervention by using artificial intelligence (AI) models, and presented to a user without requiring the user to access various applications and navigate complex and generic user interfaces of these applications.

FIG. 1 is a block diagram that illustrates an exemplary environment for generating personalized content for presentation on user devices, in accordance with an exemplary embodiment of the present disclosure. Referring to FIG. 1, the exemplary environment 100 includes first through $n^{th}$ content sources 102a-102n, and first and second user devices 104a and 104b associated with first and second users 106a and 106b, respectively. The environment 100 further includes an application server 108. The first through $n^{th}$ content sources 102a-102n, the first and second user devices 104a and 104b, and the application server 108 may communicate with each other by way of a communication network 110 or separate communication channels established therebetween. Hereinafter, the first and through $n^{th}$ content sources are collectively referred to as "plurality of content sources 102", the first and second user devices 104a and 104b are collectively referred to as "the plurality of user devices 104", and the first and second users 106a and 106b are collectively referred to as "the plurality of users 106".

Each content source 102a-102n is a device and/or a server arrangement which includes suitable logic, circuitry, interface, and/or code, executable by the circuitry, for hosting content or stories on a network (e.g., Internet, Intranet, or the like). In a non-limiting example, it is assumed that the plurality of content sources 102 host content on the Internet (i.e., the World Wide Web). Examples of the hosted content which may include, but are not limited to, news articles, videos, blogs, vlogs (video blogs), or the like. Examples of the plurality of content sources 102 which may include, but are not limited to, servers or devices that host news websites, news aggregator websites, video hosting websites, blogs, or the like. In some embodiments, the content hosted by the plurality of content sources 102 is syndicated, enabling access by other entities (e.g., the application server 108) to the hosted content. For the sake of brevity, the terms "content" and "story" are used interchangeably throughout the disclosure.

The first user device 104a is an electronic device which includes suitable logic, circuitry, interface, and/or code, executable by the circuitry, for viewing digital content. For example, the first user 106a may use the first user device 104a for reading news articles, reading blogs, watching videos, or the like. The first user device 104a may be used to access various types of digital content (e.g., videos, news articles, blogs, video blogs, or the like) hosted on a network (e.g., the World Wide Web). Examples of the first user device 104a which may include, but are not limited to, a smartphone, a tablet, a personal computer (PC), a laptop, a phablet, a smartwatch, or the like. The second user device 104b may be operated by the second user 106b and may be functionally similar to the first user device 104a. For the sake of brevity, the plurality of user devices 104 are shown to include only two user devices (i.e., the first and second user devices 104a and 104b). However, in an actual implementation, the plurality of user devices 104 may include any number of user devices (e.g., thousands or millions of user devices) associated with any number of users.

The application server 108 is a server arrangement which includes suitable logic, circuitry, interface, and/or code, executable by the circuitry, for generating personalized content and controlling presentation of the personalized content on the plurality of user devices 104. The application server 108 may be configured to search and/or collect (i.e., retrieve) stories from the plurality of content sources 102, using various methods and techniques known in the art. The various methods and techniques may include, but are not limited to, receiving newsletters, web syndication (e.g., RSS feed or JSON feed), web crawling, use of application peripheral interfaces (APIs) or the like. The application server 108 may frequently (e.g., hundreds or thousands of times in a day) access the plurality of content sources 102 to check for new or updated content. In an embodiment, the application server 108 may access the plurality of content sources 102 periodically (e.g., after every 10 minutes, one hour, or the like) to check for new or updated content. The application server 108 may select unique stories from the collected stories. The application server 108 may further assign a score to each unique story and rank the unique stories in an order based on the assigned scores. Using artificial intelligence (AI) models for text summarization, headline generation, and image selection, the application server 108 may generate a summary and a headline and select a set of images for each of highly ranked unique stories. The application server 108 may create a multimedia item for each of the highly ranked unique stories based on the generated summary, the generated headline, and the selected set of images.

The application server 108 may host a service application that is executable on the plurality of user devices 104. The service application may be a standalone application that runs on each of the plurality of user devices 104 or a web application accessible by web browsers running on each of the plurality of user devices 104. Subject to granting of requisite device permissions, the service application may present personalized content (i.e., the created multimedia items) on lock screen interfaces of the plurality of user devices 104. In some embodiments, the service application may further monitor user activity (e.g., social media activity, purchase activity, browsing history, device settings, or the like) on the plurality of user devices 104 for identification of user preferences associated with the plurality of user devices 104. The application server 108 may present relevant multimedia items on a lock screen interface of each of the plurality of user devices 104 by way of the service application based on the collected stories and the set of user preferences associated with the plurality of user devices 104. Structure and functionality of the application server 108 is explained in conjunction with FIGS. 2 and 3.

The communication network 110 is a medium through which content and messages are transmitted between the plurality of content sources 102, the plurality of user devices 104, and the application server 108. Examples of the communication network 110 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the application server 108 may be configured to receive, from the service application being executed on each of the plurality of user devices 104, user activity data (e.g., social media activity, purchase activity, browsing activity, device settings, or the like) associated with a corresponding user device 104a or 104b. The application server 108 may be configured to determine a set of user preferences associated with each of the plurality of user devices 104 based on the received user activity data. In a non-limiting example, based on the user activity data associated with the first user device 104a, the application server 108 may determine that the first user 106a is an avid traveller. In other words, the set of user preferences associated with the first user device 104a includes a preferred category (e.g., travel) and a preferred topic (e.g., beach holidays) of the first user 106a. The set of user preferences associated with the first user device 104a may further include a preferred language (e.g., English) of the first user 106a.

Further, the application server 108 may be configured to collect, from the plurality of content sources 102, a first plurality of stories. The first plurality of stories may correspond to various categories, topics, or languages. Examples of the various categories which may include, but are not limited to, sports, business, travel, current affairs, foreign policy, politics, education, science & technology, economics, culture, religion, and/or philosophy. Each category may be associated with various topics. For example, the category of sports may be associated with various topics such as football, basketball, tennis, or the like. Since the first plurality of stories are collected from different sources (i.e., the plurality of content sources 102), the first plurality of stories may include one or more duplicate stories. For example, the first plurality of stories may include multiple stories or news articles that describe the same news event (e.g., a latest development in battery technology).

The application server 108 may be configured to determine a degree of similarity between stories included in the first plurality of stories and identify duplicate stories included in the first plurality of stories. The application server 108 may segregate the first plurality of stories into a set of groups based on the determined degree of similarity between the stories included in the first plurality of stories. Each group may include stories that are duplicates of each other. Any two stories may be referred to as duplicate stories if the degree of similarity between two stories is above a determined threshold. Thus, any two stories may be considered duplicate by the application server 108 if they are semantically similar, even if they are not syntactically same. For example, two news articles (i.e., stories) written by different authors may be considered duplicate if both the news articles refer to the same event (e.g., the latest development in battery technology). The application server 108 may be configured to select, from the first plurality of stories, a second plurality of stories that do not include any duplicate stories. For selecting the second plurality of stories, the application server 108 may be configured to select, from each of the set of groups, a single story, thereby, not including any duplicate story in the second plurality of stories. Each story included in the second plurality of stories may be unique. The application server 108 may be configured to assign a score to each of the second plurality of stories based on a set of scoring rules and rank the second plurality of stories in an order based on the score assigned to each story of the second plurality of stories. The application server 108 may select a first story that has been ranked highest by the application server 108 based on the ranking of the second plurality of stories. The first story may be selected for creation of a multimedia item, e.g., a notification card, a news card, or the like.

The application server 108 may be configured to generate a summary and a headline for the selected first story by using one or more artificial intelligence (AI) models. The application server 108 may be further configured to select, from an image database, a set of images that are relevant to the first story, based on the generated summary and headline. The application server 108 may be further configured to determine a set of presentation properties. The set of presentation properties includes a font style and/or a layout for displaying the generated summary, the generated headline, and the set of images. The determination of the font style may be based on a category, a topic, and/or a language associated with the first story. The application server 108 may be configured to create a multimedia item based on the set of images, the summary, and headline. The multimedia item includes the generated summary, the generated headline, and at least one of the selected set of images. For example, the multimedia item is created by overlaying the generated summary and the generated headline on a first image of the selected set of images. The determined layout may be indicative of a manner or style in which the generated summary and the generated headline are to be overlaid on any image (e.g., the first image) of the selected set of images. For example, the determined layout may indicate a font size and a font color for displaying the generated summary and the generated headline when overlaid on the first image. The layout may further indicate a set of locations (i.e., regions to be utilized) on the first image for overlaying the generated summary and the generated headline. The layout may further indicate a count (i.e., number) of lines to be utilized for displaying the generated summary and/or the generated headline on the first image. In other words, the layout may indicate that the headline and/or the summary are/is to be split into multi-line text and overlaid on the first image.

Based on the set of user preferences associated with the first user device 104a, the application server 108 may present, on a lock screen interface of the first user device 104a, the created multimedia item, displaying the headline, the summary, and the first image of the set of images on the lock screen interface. The presented multimedia item may further include a hyperlink to the first story. Selection of the hyperlink by the first user 106a may redirect a user interface (UI) of the first user device 104a to the first story, resulting in a presentation of the first story on the first user device 104a.

Figure 2:
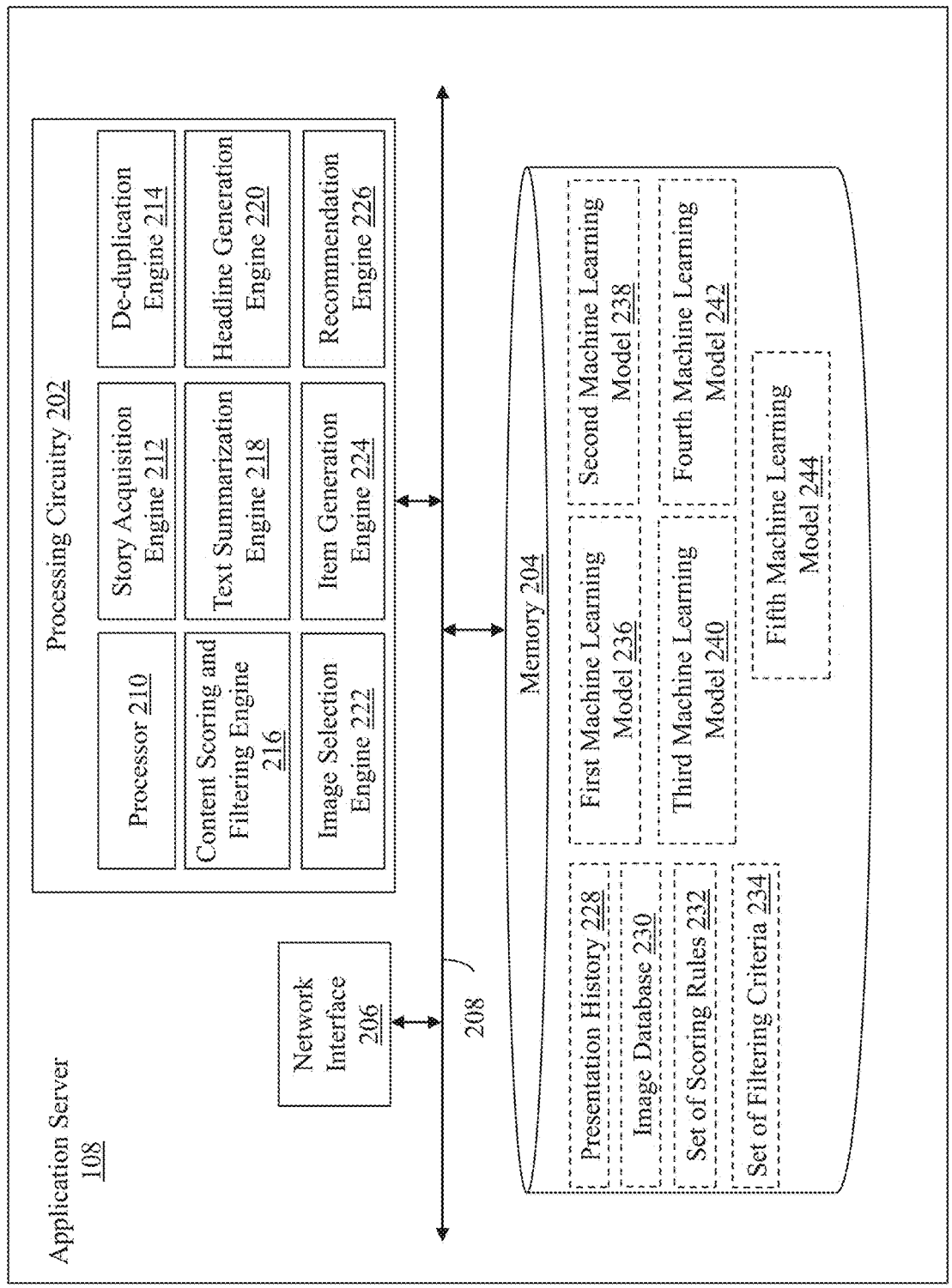
FIG. 2 is a block diagram that illustrates an application server of FIG. 1, in accordance with an exemplary embodiment of the present disclosure.

FIG. 2 is a block diagram that illustrates the application server, in accordance with an exemplary embodiment of the present disclosure. Referring to FIG. 2, the application server 108 may include a processing circuitry 202, a memory 204, a network interface 206, and a communication bus 208. The processing circuitry 202 may include a processor 210, a story acquisition engine 212, a de-duplication engine 214, and a content scoring and filtering engine 216. The processing circuitry 202 may further include a text summarization engine 218, a headline generation engine 220, an image selection engine 222, an item generation engine 224, and a recommendation engine 226.

The processing circuitry 202 may include suitable logic, circuitry, interfaces, and/or code for executing a set of instructions stored in a suitable data storage device (for example, the memory 204) to generate personalized content for presentation on the lock screen interface of each of the plurality of user devices 104. The processing circuitry 202 may execute various operations for generating and controlling the presentation of the personalized content on the plurality of user devices 104, by way of components included therein.

The processor 210 may be configured to host the service application that is executable on the plurality of user devices 104. The processor 210 may further be configured to receive, from the service application, the user activity data associated with each of the plurality of user devices 104. The processor 210 may be configured to identify the set of user preferences associated with each of the plurality of user devices 104, based on corresponding user activity data. The processor 210 may be configured to store, in the memory 204, the identified set of user preferences associated with each user device. The processor 210 may further store, in the memory 204, presentation history 228, the image database (hereinafter, referred to as "the image database 230"), a set of scoring rules 232, and a set of filtering criteria 234.

The presentation history 228 may include historical data pertaining to multimedia items previously created and presented on lock screen interfaces of user devices (e.g., the plurality of user devices 104). The historical data pertaining to each previously presented multimedia item may include, but is not limited to, a date and time of presentation of a corresponding multimedia item, a level of engagement or an interaction history associated with the corresponding multimedia item, keywords associated with the corresponding multimedia item, and/or the like. In a non-limiting example, the presentation history 228 may store, therein, a click-rate (i.e., click-through rate or CTR) associated with each multimedia item previously presented on the plurality of user devices 104. The CTR for each multimedia item may be indicative of a number of people that clicked on a corresponding presented multimedia item to view a corresponding story. For example, consider a previously presented multimedia item about beach holidays in Asia. If the previously presented multimedia item was pushed "30 million" times to "30 million" user devices in a day, and was clicked "2 million" times, then the CTR for the multimedia item will be "6.67%". The presentation history 228 may further include, word embeddings and sentence embeddings associated with each of the previously presented multimedia items. The word embeddings and sentence embeddings associated with any multimedia item may be indicative of a category, a topic, and/or a language of a corresponding story.

In one embodiment, the image database 230 may be created using a plurality of images, each of which is associated with a corresponding summary and headline. In an embodiment, the plurality of images, and corresponding summaries and headlines, may be acquired from a third-party database (e.g., gettyimages). In another embodiment, the plurality of images may be acquired from the third-party database or the plurality of content sources 102, and the corresponding summaries and headlines may be prepared by a plurality of crowdsource workers. For creating the image database 230, the processor 210 may extract a set of text elements (e.g., words, phrases, or terms) from the headline and the summary corresponding to each image of the plurality of images using one or more natural language processing (NLP) APIs. Examples of the one or more NLP APIs which may include, but are not limited to, Monkey-Learn, IBM Watson, Amazon Comprehend, Aylien, Cortical.io, TextRazor, or the like. In an embodiment, a case correction using a machine learning model (e.g., a deep learning model) may be performed on the headline and the summary corresponding to each image of the plurality of images. Case correction in a text (e.g., the headline and the summary) enables efficient extraction of text elements. The extracted set of text elements may include all possible words, phrases, terms, or the like, that may potentially be keywords. Each text element, of the set of text elements extracted from each summary and headline, is scored using machine learning techniques, to determine a probability of a corresponding text element being a keyword. Based on the score and/or a probability threshold, one or more words, phrases, terms, or the like may be selected as keyword(s) for the one or more associated images. For example, if an image is associated with a headline "Ten ways to lose weight fast", text elements such as "weight", "lose weight", "lose weight fast" may be selected as keywords for the corresponding image. In case of unavailability of summaries, headlines, or descriptions for the plurality of images, computer vision APIs (e.g., Google Vision APIs) may be used to extract one or more image features such as a presence of specific person (e.g., a celebrity), a presence of objects (e.g., vehicles), time of day (e.g., dusk) or the like. For each image, the processor 210 may tag corresponding keywords as metadata with the corresponding image. The extracted one or more image features may also be used as metadata for tagging images. Then, the images and the associated metadata may be stored in the image database 230.

The set of scoring rules 232 may include a set of rules for assigning scores to stories (e.g., the second plurality of stories). For example, a rule in the set of rules may indicate that a story with a higher CTR may have a higher score. The set of filtering criteria 234 may be indicative of a set of rules for filtering out inappropriate content. For example, the set of filtering criteria 234 may define categories and topics of the inappropriate content.

The story acquisition engine 212 may collect the first plurality of stories from the plurality of content sources 102. The first plurality of stories may be collected through use of various methods and techniques (e.g., web crawlers, web syndication, or the like) known in the art.

The de-duplication engine 214 may be configured to determine a degree of similarity between stories of the first plurality of stories for identifying duplicate stories among the first plurality of stories. The degree of similarity, between the stories of the first plurality of stories, may be identified using a first machine learning model 236. The first machine learning model 236 may be trained to generate word and/or sentence embeddings for any description or body of text provided as input to the first machine learning model 236. Based on the degree of similarity between the stories included in the first plurality of stories, the de-duplication engine 214 may select, from the first plurality of stories, the second plurality of stories such that each of the second plurality of stories is a unique story. The process of de-duplication using the first machine learning model 236 is explained in conjunction with FIG. 3.

The content scoring and filtering engine 216 may assign, based on the set of scoring rules 232, a score to each story of the second plurality of stories. The content scoring and filtering engine 216 may utilize a second machine learning model 238 for assigning the score to each of the second plurality of stories. In an embodiment, the content scoring and filtering engine 216 may be configured to train the second machine learning model 238 to predict CTR (or a score) for any given story based on word and sentence embeddings associated with a corresponding story. Examples of the second machine learning model 238 which may include, but are not limited to, a random forest model, a gradient boosting tree model, a K-means model, a decision tree model, a naïve Bayes model, or the like.

In an embodiment, the content scoring and filtering engine 216 may be configured to train the second machine learning model 238 based on the interaction history of the plurality of users 106 with the previously presented multimedia items and word and sentence embeddings associated with the previously presented multimedia items. In other words, the content scoring and filtering engine 216 may utilize the presentation history 228 to train the second machine learning model 238. The content scoring and filtering engine 216 may train the second machine learning model 238 to learn, based on the presentation history 228, correlations between CTR and various aspects (e.g., category, type, language, writing style, author, or the like) indicated by the word and sentence embeddings of stories. For example, the second machine learning model 238 may determine or learn that stories that are in English have been associated with a higher CTR than stories in Korean. In other words, the second machine learning model 238 may correlate a CTR range observed in the presentation history 228 for the English stories with word and sentence embeddings of English stories. Similarly, the second machine learning model 238 may learn that stories pertaining to "space exploration" are associated with a higher CTR than stories that pertain to "nanotechnology".

The assigning of the score to each story, of the second plurality of stories, may be further based on the set of filtering criteria 234. The content scoring and filtering engine 216 may rank the second plurality of stories, based on the score assigned to each of the second plurality of stories.

The text summarization engine 218 may be configured to generate summaries for stories (e.g., the first story), of the second plurality of stories, that are ranked highly by the content scoring and filtering engine 216. The text summarization engine 218 may utilize a third machine learning model 240 to generate the summaries for the stories (e.g., the first story).

In an embodiment, the third machine learning model 240 may be a deep learning model (e.g., a neural network-based model) that uses various summarization techniques (e.g., extractive summarization or abstractive summarization techniques) for generation of summaries. The third machine learning model 240 may be pre-trained on a large natural language corpus (e.g., English Wikipedia and BookCorpus). The third machine learning model 240 may be fine-tuned for different types of labeled data for various natural language processing (NLP) tasks such as text classification and abstractive summarization. In an exemplary scenario, the text summarization engine 218 may train the third machine learning model 240 based on a first training dataset. The first training dataset may include a description (i.e., full text), a summary, and a title of each of a set of sample stories. For training the third machine learning model 240, the text summarization engine 218 may be configured to provide the first training dataset as an input to the third machine learning model 240. The third machine learning model 240 may be configured to implement the techniques of supervised learning to learn correlations between a description and a summary of a story included in the first training dataset. For example, the third machine learning model 240 may be further configured to determine a plurality of features that affect generation of summaries. Each of the determined plurality of features may have a high degree of correlation with the generation of summaries. Each feature of the determined plurality of features may be associated with a corresponding weight that is indicative of an extent to which the feature is correlated with the generation of summaries. Examples of the plurality of features may include, but are not limited to, a count of proper nouns in a description, a frequency of each proper noun in a description, a frequency of common nouns in a description, a tone (e.g., positive, negative, or neutral) of the description, or the like. The third machine learning model 240 may determine, based on information included in the first training dataset, a plurality of feature values for the plurality of features. For example, for a story (i.e., a description or a full text) that describes a tennis match between two players (e.g., Rafael Nadal and Novak Djokovic), the third machine learning model 240 may determine that "Rafael Nadal" and "Novak Djokovic" are proper nouns in the story. Further, the third machine learning model 240 may determine a number of times (i.e., frequency) "Rafael Nadal" and "Novak Djokovic" each occur in the story. The third machine learning model 240 may further determine a number of times (i.e., frequency) "match", "contest", "victory", "winning", "score", "points", or the like occur in the story. The third machine learning model 240 may be trained based on the determined plurality of feature values for the plurality of features and summaries (e.g., "Nadal beats Djokovic in straight sets to clinch victory at the French Open") included in the first training dataset. The third machine learning model 240 may also learn to assign weights to different keywords of a story based on the description-summary correlations observed in the first training dataset. Accordingly, the third machine learning model 240 may learn to paraphrase and/or summarize inputted descriptions of stories. In other words, the third machine learning model 240 is trained based on the first training dataset to determine summaries for stories, based on descriptions (i.e., full text) of the stories. The generated summaries may be accurate in regards to corresponding descriptions. The third machine learning model 240 may further be trained to ensure grammatical consistency in generated summaries. For example, the processor 210 may be configured to provide a grammar library as an input to the third machine learning model 240. The third machine learning model 240 may then utilize the grammar library to detect and resolve grammatical inconsistencies in the generated summaries.

In some embodiments, the third machine learning model 240 may be further trained to generate "catchy" summaries. To generate catchy summaries, the third machine learning model 240 may be trained to generate summaries subject to word-limit or character-limit constraints. For example, a character-limit of "120" may be imposed for summaries. In such a scenario, any summary generated by the third machine learning model 240 may include "120" characters or less.

Examples of the third machine learning model 240 which may include, but are not limited to, AI models, deep learning models, unified language model (UniLM), rule-based models, ontology-based models, multimodal semantic models, lead body and phrase models, or the like.

In some embodiments, the summaries that are generated by the third machine learning model 240 may be subject to manual verification or confirmation, for example, by an editor. Some of the generated summaries may further be edited or modified by the editor. The text summarization engine 218 may determine a set of summaries that were modified by the editor. Further, the text summarization engine 218 may determine an extent or degree to which each of the determined set of summaries was modified by the editor. In other words, the text summarization engine 218 determines, for each of the determined set of summaries, a degree of correlation between a corresponding summary before modification by the editor to the corresponding summary post modification by the editor. For any of the determined set of summaries, if the degree of correlation is below a pre-determined threshold, the text summarization engine 218 may provide, as an input to the third machine learning model 240, a corresponding story and a corresponding summary modified or edited by the editor. In a non-limiting example, the text summarization engine 218 determines that a summary generated by the third machine learning model 240 is modified by the editor. The text summarization engine 218 may determine that out of "16" words included in the generated summary, "10" words have been modified by the editor. The text summarization engine 218 may further determine a degree of correlation between the generated summary and the modified summary. The determined degree of correlation may be poor, since over "50%" of the words included in the generated summary are modified by the editor. In such a scenario, based on the poor degree of correlation (i.e., the degree of correlation being below the pre-determined threshold), the third machine learning model 240 may provide the modified (i.e., edited) summary and a full text of a corresponding story as input to the third machine learning model 240. The third machine learning model 240 may be re-trained based on the provided input to improve an accuracy of the third machine learning model 240 in the generation of summaries. Based on the re-training, the weights associated with the plurality of features may be adjusted.

The headline generation engine 220 may be configured to generate headlines for stories (e.g., the first story), of the second plurality of stories, that are ranked highly by the content scoring and filtering engine 216. The headline generation engine 220 may utilize a fourth machine learning model 242 to generate the headlines for the stories (e.g., the first story).

In an embodiment, the fourth machine learning model 242 may be a deep learning model (e.g., a neural network-based model) that uses various techniques for generation of headlines. The headline generation engine 220 may be configured to train the fourth machine learning model 242 to determine headlines for stories based on corresponding summaries and/or descriptions. The headline generation engine 220 may utilize a second training dataset to train the fourth machine learning model 242. The second training dataset may include a description (i.e., full text), a headline, and a summary of each of a set of sample stories. The headline generation engine 220 may train the fourth machine learning model 242 using the techniques of supervised or unsupervised learning. For training the fourth machine learning model 242, the headline generation engine 220 may be configured to provide the second training dataset as input to the fourth machine learning model 242. The fourth machine learning model 242 may be configured to implement the techniques of supervised learning to learn correlations between a description and a headline of a story included in the second training dataset.

For example, the fourth machine learning model 242 may be further configured to determine a plurality of features that affect generation of headlines. Each of the determined plurality of features may have a high degree of correlation with the generation of headlines. Each feature of the determined plurality of features may be associated with a corresponding weight that is indicative of an extent to which the feature is correlated with the generation of headlines. Examples of the plurality of features include, but are not limited to, a count of proper nouns in a description, a frequency of each proper noun in a description, a frequency of common nouns in a description, a tone (e.g., positive, negative, or neutral) of the description, or the like. The fourth machine learning model 242 may determine, based on information included in the second training dataset, a plurality of feature values for the plurality of features. For example, for the story that describes the tennis match between Rafael Nadal and Novak Djokovic, the fourth machine learning model 242 may determine that "Rafael Nadal" and "Novak Djokovic" are proper nouns in the story. Further, the fourth machine learning model 242 may determine a number of times (i.e., frequency) "Rafael Nadal" and "Novak Djokovic" each occurs in the story. The fourth machine learning model 242 may further determine a number of times (i.e., frequency) "match", "contest", "victory", "winning", "score", "points" or the like occur in the story. The fourth machine learning model 242 may be trained based on the determined plurality of feature values for the plurality of features and headlines (e.g., "Nadal wins French Open") included in the second training dataset.

The fourth machine learning model 242 may also learn to assign weights to different keywords of a story based on the description-headline correlations observed in the second training dataset. Accordingly, the fourth machine learning model 242 may learn to paraphrase and/or shorten inputted summaries and/or descriptions of stories for headline generation based on weight assignment. In other words, the fourth machine learning model 242 is trained, based on the second training dataset, to determine headlines for stories, based on descriptions (i.e., full text) or summaries of the stories. The fourth machine learning model 242 may be further trained to ensure grammatical consistency in the generated headlines. The generated headlines may be accurate with regards to corresponding descriptions and/or summaries. For example, the headline generation engine 220 may be configured to provide the grammar library as an input to the fourth machine learning model 242. The fourth machine learning model 242 may then utilize the grammar library to detect and resolve grammatical in generated headlines.

In some embodiments, the fourth machine learning model 242 may be further trained to generate "catchy" headlines. To generate catchy headlines, the fourth machine learning model 242 may be trained to generate headlines subject to word-limit or character-limit constraints. For example, a character-limit of "40" may be imposed for headlines. In such a scenario, any headline generated by the fourth machine learning model 242 may include "40" characters or less. For the generation of catchy headlines, the fourth machine learning model 242 may be further trained to use known abbreviations or slangs for various words or phrases. For example, "United states of America" may be abbreviated to "US" or "USA", "Rafael Nadal" to "Nadal" or "Rafa", "Novak Djokovic" to "Djokovic", or "Shaquille O'Neal" to "Shaq". Similarly, "shrink" may be used as slang for "psychologist" or "going under the knife" may be used as a phrase for "undergoing a surgery". It will be apparent to those of skill in the art that abbreviations, slangs, or phrases are not limited to those mentioned above.

Examples of the fourth machine learning model 242 which may include, but are not limited to, UniLM, rule-based models, ontology-based models, multimodal semantic models, lead body and phrase models, or the like.

In some embodiments, the headlines that are generated by the fourth machine learning model 242 may be subject to manual verification or confirmation, for example, by an editor. Some of the generated headlines may further be edited or modified by the editor. The headline generation engine 220 may determine a set of headlines that were modified by the editor. Further, the headline generation engine 220 may determine an extent or degree to which each of the determined set of headlines was modified by the editor. In other words, the headline generation engine 220 determines, for each of the determined set of headlines, a degree of correlation between a corresponding headline before modification by the editor to the corresponding headline post modification by the editor. For any of the determined set of headlines, if the degree of correlation is below a pre-determined threshold, the headline generation engine 220 may provide, as an input to the fourth machine learning model 242, a corresponding story and a corresponding headline modified or edited by the editor. In a non-limiting example, the headline generation engine 220 determines that a headline generated by the fourth machine learning model 242 is modified by the editor. The headline generation engine 220 may determine that out of "8" words included in the generated headline, "6" words have been modified by the editor. The headline generation engine 220 may further determine a degree of correlation between the generated headline and the modified headline. The determined degree of correlation may be poor, since over "50%" of the words included in the generated headline are modified by the editor. In such a scenario, based on the poor degree of correlation (i.e., the degree of correlation being below the pre-determined threshold), the fourth machine learning model 242 may provide the modified (i.e., edited) headline and a full text of a corresponding story as input to the fourth machine learning model 242. The fourth machine learning model 242 may be re-trained based on the provided input to improve an accuracy of the fourth machine learning model 242 in the generation of headlines. Based on the re-training, the weights associated with the plurality of features may be adjusted.

The image selection engine 222 may be configured to select from the image database 230, a set of images for a story (e.g., the first story). The selection of the set of images for the first story may be based on the generated summary and headline for the first story. In some embodiments, the image selection engine 222 may utilize a fifth machine learning model 244 to select the set of images for the first story. The fifth machine learning model 244 may be a deep learning model trained to generate vectors representative of a text of a story (i.e., the headline and the summary for the first story) and corresponding image tags. Examples of the fifth machine learning model 244 which may include, but is not limited to, universal sentence encoder, SentenceBERT, InferSent, Doc2vec, or the like.

The item generation engine 224 may be configured to create a multimedia item for presentation on the plurality of user devices 104. For example, the item generation engine 224 may create a multimedia item for the first story based on the generated summary, the generated headline, and the set of images selected for the first story. Prior to the creation of the multimedia item, the item generation engine 224 may determine a set of presentation properties for creating the multimedia item. The set of presentation properties may include a font style and a layout for displaying the generated summary, the generated headline, and any of the set of images on the lock screen interface of the first user device 104a. The item generation engine 224 may create the multimedia item based on the determined set of presentation properties.

The recommendation engine 226 may render the created multimedia item on the lock screen interface of the first user device 104a, based on the identified set of user preferences associated with the first user device 104a. In other words, the recommendation engine 226 may present the created multimedia item on the lock screen interface of the first user device 104a, displaying the generated summary, the generated headline, and an image (e.g., a first image) of the selected set of images. The recommendation engine 226 may present the multimedia item on the lock screen interface of the first user device 104a, by way of the service application being executed on the first user device 104a. The presented multimedia item further includes the hyperlink to the first story. Upon the selection of the hyperlink by the first user 106a, the UI of the first user device 104a may be redirected to the content source, of the plurality of content sources 102, hosting the first story. The first story is presented on the first user device 104a.

Examples of the processor 210, the story acquisition engine 212, the de-duplication engine 214, the content scoring and filtering engine 216, the text summarization engine 218, the headline generation engine 220, the image selection engine 222, the item generation engine 224, and the recommendation engine 226 may include, but are not limited to, an application-specific integrated circuit (ASIC) processor, a reduced instruction set computer (RISC) processor, a complex instruction set computer (CISC) processor, a field programmable gate array (FPGA), a central processing unit (CPU), or the like.

The memory 204 may include suitable logic, circuitry, and/or interfaces for storing the set of instructions to be executed by one or more components of the processing circuitry 202 for generating and presenting personalized content on user devices (e.g., the plurality of user devices 104). The memory 204 may be configured to store data that is required by one or more components of the processing circuitry 202 for executing the set of instructions. For example, the memory 204 may be configured to store the presentation history 228, the image database 230, the set of scoring rules 232, and the set of filtering criteria 234. The memory 204 may be further configured to store the first through fifth machine learning models 236-244.

Examples of the memory 204 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 204 in the application server 108, as described herein. In another embodiment, the memory 204 may be realized in form of a database server or a cloud storage working in conjunction with the application server 108, without departing from the scope of the disclosure.

The network interface 206 may include suitable logic, circuitry, interfaces, and/or code, executable by the circuitry, to transmit and receive data over the communication network 110 using one or more communication network protocols. The network interface 206 may receive messages (e.g., the user activity data and the first plurality of stories) from the plurality of user devices 104, and the plurality of content sources 102. The network interface 206 may transmit messages (e.g., the created multimedia item) to the plurality of user devices 104. Examples of the network interface 206 may include, but are not limited to, an antenna, a radio frequency transceiver, a wireless transceiver, a Bluetooth transceiver, an ethernet port, or any other device configured to transmit and receive data.

Figure 3:
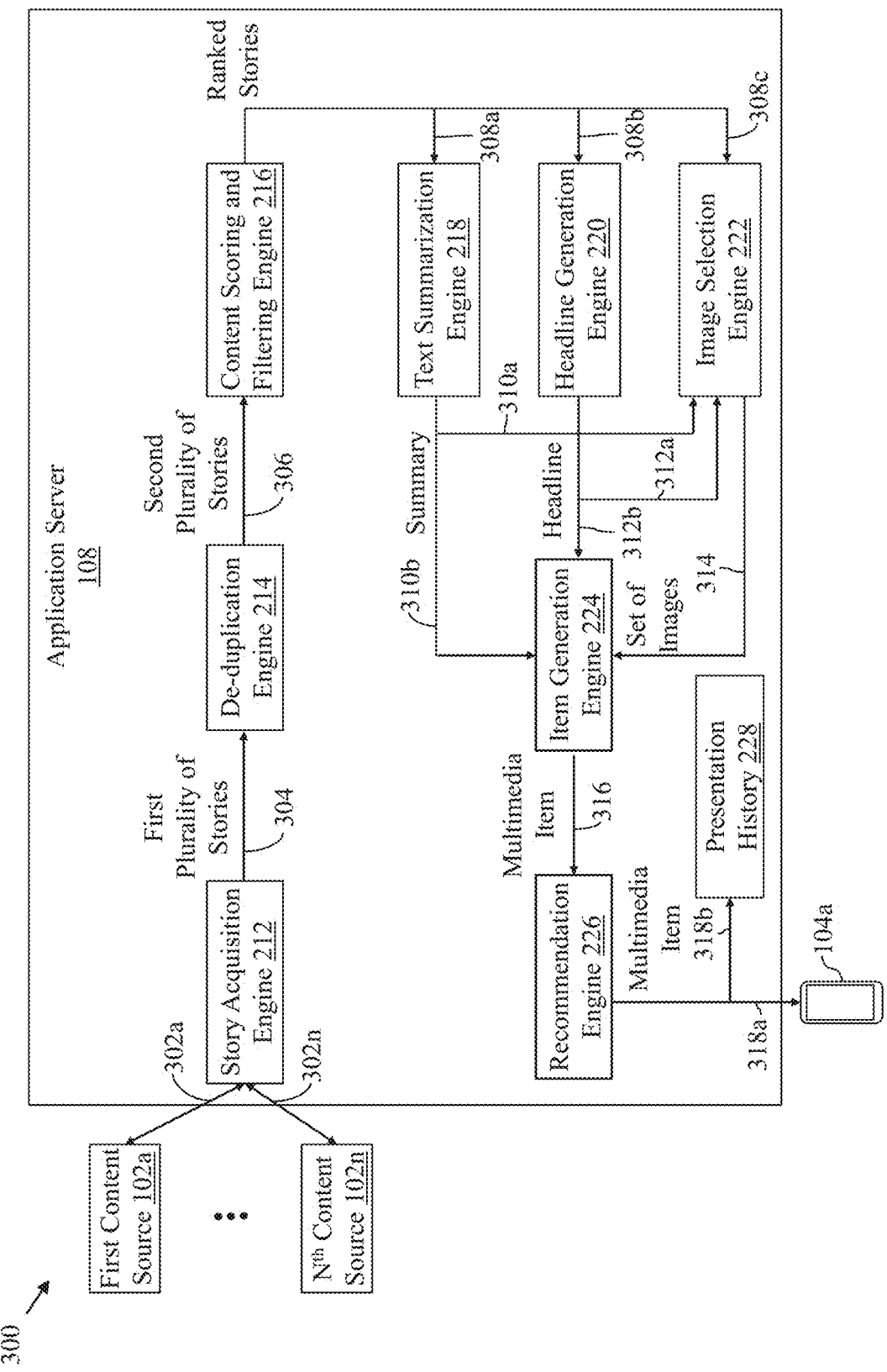
FIG. 3 is a diagram that illustrates a process flow for automatic generation of personalized content for presentation on a user device of FIG. 1, in accordance with an exemplary embodiment of the present disclosure.

FIG. 3 is a diagram that illustrates a process flow for automatic generation of personalized content for presentation on the first user device, in accordance with an exemplary embodiment of the present disclosure. Referring to FIG. 3, there is shown a process flow diagram 300.

The story acquisition engine 212 may collect the first plurality of stories from the plurality of content sources 102 (as shown by arrows 302a-302n). Each story of the first plurality of stories may include a title and a description (i.e., full text of a corresponding story). As described in the foregoing description of FIG. 1, the first plurality of stories may correspond to various categories, topics, and languages. In a non-limiting example, it is assumed that the first plurality of stories includes "1000" stories collected from "40" different sources (i.e., the plurality of content sources 102). In addition to the first plurality of plurality of stories, the story acquisition engine 212 may collect metadata associated with each of the first plurality of stories. The metadata associated with each story of the first plurality of stories may include, but is not limited to, a uniform resource locator (URL) or a hyperlink of a corresponding story, a date and time of publishing of the corresponding story, a language of the corresponding story, a name of an author of the corresponding story, or the like. The story acquisition engine 212 may temporarily store the first plurality of stories, and the metadata associated with each story, in the memory 204. The story acquisition engine 212 may provide the collected first plurality of stories and the associated metadata to the de-duplication engine 214 for further processing (as shown by arrow 304).

The de-duplication engine 214 may receive the first plurality of stories and the associated metadata from the story acquisition engine 212. The de-duplication engine 214 may extract a set of textual elements from each of the first plurality of stories. The set of textual elements extracted from each story may include, but is not limited to, a corresponding title, a corresponding description (i.e., body of text), a corresponding category (e.g., sports), a corresponding language, or the like. The de-duplication engine 214 may determine a degree of semantic (semantic text similarity or STS) and syntactic similarity between the stories included in the first plurality of stories based on the set of textual elements extracted from each story. Syntactic similarity between two stories may refer to an extent of use of similar or same words in the two stories. Semantic similarity between two stories may refer to an extent of similarity of a meaning of each of the two stories. In other words, the de-duplication engine 214 determines whether content included in any two stories, of the first plurality of stories, is similar. The de-duplication engine 214 utilizes the first machine learning model 236 to determine the degree of similarity between the stories included in the first plurality of stories. Examples of the first machine learning model 236 which may include, but are not limited to, word embeddings models, sentence embeddings models, or a combination thereof. In one non-limiting example, the first machine learning model 236 is an ensemble model that is a combination of a word2vec model and a sentence embedding model.

The word2vec model is a machine learning model (e.g., neural network-based model) that is trained to learn associations between words in text corpora. The word2vec model may represent each word as unique vector (e.g., a one-hot encoding vector) and determine a word embedding for each word included (in a corresponding title or description) in each story of the first plurality of stories. Embeddings establish logical relationships between words by mapping similar words to points (i.e., vectors) that are close together in the embedding space. As is known to those of skill in the art, embeddings convert large sparse vectors (e.g., one-hot encoding vectors representing a bag of words) into representations in a lower dimensional space, while preserving semantic relationships.

A sentence embedding for each sentence in a story may be computed based on an average of word embeddings of words included in a corresponding sentence. The sentence embedding model may be a machine learning model (e.g., a neural network-based model) that uses various techniques for determining sentence embeddings such as, but not limited to, doc2vec, SentenceBERT, InferSent, universal sentence encoder, or the like. For the sake of brevity, in the current embodiment, it is assumed that the sentence embedding model corresponds to universal sentence encoder. Sentence embedding techniques represent sentences and corresponding semantic information as vectors in an embedding space, capturing various aspects (e.g., a context, an intention, or the like) of an entire piece of text (e.g. a description of a story).

Based on the set of textual elements extracted from each of the first plurality of stories, the de-duplication engine 214 may generate a set of vectors indicative of each word in the title and description of each story of the first plurality of stories. The de-duplication engine 214 may provide the generated set of vectors to the first machine learning model 236 as input. The first machine learning model 236 may determine, based on the provided input, a set of word embeddings and a set of sentence embeddings for each story of the first plurality of stories. For determining the degree of similarity between any two stories (e.g., the first and second stories of the first plurality of stories), the de-duplication engine 214 may determine a distance (e.g., cosine distance, Euclidean distance, Jaccard distance, word mover's distance) between word embeddings corresponding to each of the two stories and sentence embeddings corresponding to each of the two stories. In a non-limiting example, it is assumed that the de-duplication engine 214 determines cosine distances between embeddings (i.e., cosine distances between word embeddings and cosine distances between sentence embeddings). For determining the degree of similarity between the two stories, the de-duplication engine 214 may determine an average of the cosine distances between the word embeddings and the sentence embeddings between the two stories. The cosine distance between any two vectors corresponds to a value between "0" and "1", such that a higher value corresponds to a lower distance (i.e., high degree of similarity). If the average of the cosine distances, between the word embeddings and the sentence embeddings corresponding to the two stories, is greater than the determined threshold (e.g., "0.7"), the two stories are determined to be similar.

In some embodiments, for reducing computational complexity, the de-duplication engine 214 may consider stories corresponding different categories or different languages as dissimilar. Therefore, the de-duplication engine 214 may only determine the degree of similarity between stories that correspond to the same language or same category (e.g., sports). The de-duplication engine 214 may segregate the first plurality of stories into the set of groups based on the determined degree of similarity between the stories of the first plurality of stories. The degree of similarity between any two stories that are segregated in the same group is above the determined threshold. For example, the first story may correspond to an article advocating holiday travel to islands in Asia. A second story, of the first plurality of stories, may correspond to a release of a new automobile by a vehicle manufacturer. A third story, of the first plurality of stories, may correspond to holidays on the islands in Asia. In a non-limiting example, the first and third stories may be segregated into the same group (e.g., a first group of the set of groups), since both the first and third stories refer to travelling to the islands in Asia.

Even though the first and third stories may be collected from different sources and may be written by different authors, the first and third stories are considered duplicates, since the first and third stories refer to a same subject (i.e., holidaying on the islands in Asia). Similarly, the second story may be segregated into a second group of the set of groups, since a category (e.g., automobiles) of the second story is different from a category (e.g., sports) of the first and third stories. The segregation of the first plurality of stories into the set of groups is subject to the determined threshold. In a non-limiting example, it is assumed that the de-duplication engine 214 segregates the first plurality of stories into "150" groups. In other words, the "1,000" stories included in the first plurality of stories are segregated into "150" groups. It will be apparent to those of skill in the art that a higher defined threshold may result in a larger number of stories being considered unique (i.e., more groups). A lower defined threshold may result in fewer stories being considered unique (i.e., less groups). In some embodiments, the defined threshold may be adjustable by the processor 210, enabling the processor 210 to maintain granular-level of control over the segregation of the first plurality of stories.

The de-duplication engine 214 may select the second plurality of stories from the first plurality of stories. The selection of the second plurality of stories includes selecting one story from each of the set of groups. In other words, the de-duplication engine 214 selects "150" stories from the first plurality of stories by selecting one story from each of the "150" groups. Each of the second plurality of stories is considered a unique story. The degree of similarity between any two stories of the second plurality of stories is below the determined threshold. In some embodiments, the de-duplication engine 214 may determine whether any story that is a duplicate of any of the first plurality of stories was previously presented within a look-back window (e.g., "7" days). If it is determined that a multimedia item corresponding to a similar (i.e., duplicate) story was previously presented on the plurality of user devices 104, the de-duplication engine 214 discards corresponding similar stories and does not select these stories in the second plurality of stories. In a non-limiting example, if the de-duplication engine 214 determines that a story pertaining to an increase in forest fires in California was presented within the look-back window, the second plurality of stories may not include any stories related to forest fires in California. The de-duplication engine 214 may provide the second plurality of stories to the content scoring and filtering engine 216 (as shown by arrow 306).

The content scoring and filtering engine 216 may be configured to assign a score to each of the second plurality of stories, based on the set of scoring rules 232. In one non-limiting example, the set of scoring rules 232 may indicate that each of the second plurality of stories is to be assigned a score based on an interaction history of the plurality of users 106 with the set of multimedia items previously presented on the plurality of user devices 104. The interaction history of the plurality of users 106 may be included in the presentation history 228.

The content scoring and filtering engine 216 may provide, to the trained second machine learning model 238, the word and sentence embeddings for each of the second plurality of stories. The trained second machine learning model 238 may predict a CTR for each of the second plurality of stories based on the provided input. Thus, the second machine learning model 238 predicts the CTR for each of the second plurality of stories based on historical performance of similar stories, i.e., the interaction history or the CTR of the previously presented multimedia items corresponding to the stories having the same category or topic as the second plurality of stories. The content scoring and filtering engine 216 may assign a score to each of the second plurality of stories based on the predicted CTR for each of the second plurality of stories. In an embodiment, the predicted CTR of each of the second plurality of stories may correspond to the score of the corresponding story. Thus, a higher predicted CTR may correspond to a higher score.

In some embodiments, the content scoring and filtering engine 216 may further use one or more machine learning models (e.g., deep learning models, categorization models, or the like) to analyze keywords and/or sentiment, associated with each of the second plurality of stories, for inappropriate content. Examples of inappropriate content which may include, but are not limited to, violence, abuse, self-harm, trolling, sexual content, promotional content, cross-OEM promotional content, sensitive content, or the like. In one implementation, text categorization and sentiment analysis methods are used to filter partisan aspects of politics, for example. As part of such an implementation, descriptions of stories (e.g., the second plurality of stories) are labelled as one of positive, negative and neutral by computationally identifying and categorizing opinions expressed in the stories. Overtly positive or negative stories pertaining to politics may be classified as inappropriate. In one example, the rules for classifying or defining inappropriate content may be included in the set of filtering criteria 234. Thus, the second plurality of stories may be labelled as appropriate or inappropriate based on the set of filtering criteria 234. The content scoring and filtering engine 216 may assign a low score or a zero score to stories that include inappropriate content as defined by the set of filtering criteria 234.

The content scoring and filtering engine 216 may rank the second plurality of stories based on the score assigned to each of the second plurality of stories. Stories with a low predicted CTR and stories that include inappropriate content have a low rank owing to the low score assigned to corresponding stories. Stories that lack inappropriate content and have a high predicted CTR have a high rank. In a non-limiting example, the first story may be ranked highest among the second plurality of stories. The content scoring and filtering engine 216 may provide a set of highly ranked stories (i.e., filtered stories) of the second plurality of stories, to the text summarization engine 218, the headline generation engine 220, and the image selection engine 222 for further processing (as shown by arrows 308a-308c). The set of highly ranked stories may include multiple stories from the second plurality of stories. In a non-limiting example, the set of highly ranked stories may include only stories that are in a top 10 percentile, in terms of assigned scores. In other words, if the second plurality of stories includes "150" stories, the set of highly ranked stories may include 15 highest ranking stories among the second plurality of stories. Similarly, if the second plurality of stories includes "10,000" stories, the set of highly ranked stories may include 1,000 highest ranking stories among the second plurality of stories. In some embodiments, if a score assigned to each story of the second plurality of stories is equal to or greater than a pre-defined score threshold, the set of highly ranked stories may include each of the second plurality of stories.

For the sake of brevity, the operations of the text summarization engine 218, the headline generation engine 220, and the image selection engine 222 have been described with respect to the first story included in the set of highly ranked stories.

The text summarization engine 218 may receive the first story from the content scoring and filtering engine 216. The text summarization engine 218 may provide a description and a title of the first story as an input to the trained third machine learning model 240. The trained third machine learning model 240 may generate a summary for the first story, based on the inputted description and title of the first story. In other words, the text summarization engine 218 may generate the summary of the first story based on an output of the trained third machine learning model 240 for the inputted description and title of the first story. In some embodiments, the generation of the summary may be subject to certain constraints, for example, a word limit or a character limit. For example, the generated summary of the summary may include less than "100" characters. The text summarization engine 218 may provide the generated summary to the image selection engine 222 and the item generation engine 224 (as shown by arrows 310a and 310b).

The headline generation engine 220 may receive the first story from the content scoring and filtering engine 216. The headline generation engine 220 utilizes the fourth machine learning model 242 for headline generation. The headline generation engine 220 may provide the description of the first story as an input to the trained fourth machine learning model 242. The trained fourth machine learning model 242 may generate a headline for the first story, based on the inputted description. In other words, the headline generation engine 220 may generate the headline of the first story based on an output of the trained fourth machine learning model 242 for the inputted description or summary of the first story. In some embodiments, the generation of the headline may be subject to certain constraints, for example, a word limit or a character limit. For example, the generated headline of the first story may include less than "5" characters. The headline generation engine 220 may provide the generated headline to the image selection engine 222 and the item generation engine 224 (as shown by arrows 312a and 312b).

The image selection engine 222 may receive the generated summary and the generated headline from the text summarization engine 218 and the headline generation engine 220, respectively. The image selection engine 222 may be configured to select the set of images, from the image database 230, for the first story. The image database 230 may be generated or created prior to the selection of the set of images.

In some embodiments, the image selection engine 222 may utilize a machine learning model (e.g., a deep learning model) for performing case correction (e.g., converting all words to capital or lower case) on the headline and summary of the given story. The machine learning model may be trained to receive text with random casing and perform case correction on the text to output text with uniform casing. The case-corrected text (e.g., the headline and the summary) may be used for efficient keyword extraction.

For selecting the set of images, the image selection engine 222 may extract a set of keywords (e.g., words, phrases, or the like) from the generated summary and headline. In an embodiment, when the first story includes one or more images, the image selection engine 222 may be configured to extract various tags (e.g., words, phrases, image features, or the like) associated with the images in the first story. The image selection engine 222 may match the extracted set of keywords and extracted tags with the tags (i.e., metadata) in the image database 230 using various methods, for example, a n-gram string matching method. Based on the matching of the extracted set of keywords or tags with the tags in the image database 230, the image selection engine 222 may select at least one image for use as a background image for the first story.

In another embodiment, text of a story (i.e., the headline and the summary for the first story) and image tags may be represented as numerical vectors (e.g., word embeddings) using the fifth machine learning model 244. A set of images whose vectors are at the lowest cosine distance from the sentence and word embedding vector of the first story is selected for the story (i.e., the first story) by the image selection engine 222. The image selection engine 222 may provide the set of images to the item generation engine 224 (as shown by arrow 314). In a non-limiting example, it is assumed that the set of images includes first through third images that are selected by the image selection engine 222 for being relevant to the first story.

The item generation engine 224 may receive the generated summary, the generated headline, and the selected set of images. The item generation engine 224 may be configured to create the multimedia item for presentation on various user devices. For creating the multimedia item, the item generation engine 224 may determine a set of presentation properties for presentation of the multimedia item on lock screen interfaces of user devices (e.g., the first user device 104a). The determination of the set of presentation properties may be based on various attributes associated with the first story. The various attributes may include, but is not limited to, the category (e.g., sports) associated with the first story, the topic associated with the first story, the language associated with the first story, or the like. The set of presentation properties may include a font style, a layout, an image resolution, or the like for displaying the generated summary, the generated headline, and one of the selected set of images on the lock screen interfaces of the plurality of user devices 104.

In an exemplary scenario, the item generation engine 224 may select (i.e., determine) a font style for the summary and the headline. Different font styles may be selected for the summary and the headline. However, for the sake brevity, it is assumed that a single font style is selected for both the summary and the headline. The font style may be selected based on the category associated with the first story. For example, if the first story corresponds to business news or policy news, a formal font (e.g., Times New Roman) may be selected. In another example, a casual or less-formal font may be selected for displaying sports news.

Following the selection of the font style, the item generation engine 224 may detect, based on a set of image processing techniques, a set of objects in an image (e.g., the first image) of the selected set of images. The set of image processing techniques include, but are not limited to, object recognition, image classification, object localization, object detection, object segmentation, or the like. The item generation engine 224 may include therein a machine learning model (e.g., a convolution neural network, a "You Only Look Once" or YOLO model, or the like) trained to detect the set of objects.

The item generation engine 224 may detect, based on the set of image processing techniques, the set of objects (e.g., human faces, animals, inanimate objects, or the like) in each image of the set of images. For example, the item generation engine 224 may identify, in the first image, a basketball player and a basketball. The item generation engine 224 may identify a set of locations on the first image for overlaying the generated headline and the generated summary based on the identification of the set of objects (e.g., the basketball and the basketball) in the first image. For example, the item generation engine 224 may determine that the summary and the headline are to be overlayed on a bottom-left of an image (i.e., any of the first through third images). The set of locations for overlaying the summary and the headline are determined such that important or relevant parts, such as detected objected (e.g., the basketball player or the basketball), of a displayed image are not obscured. The item generation engine 224 may further identify a background color of the first image at each of the determined set of locations. In other words, the item generation engine 224 may identify a dominant background color and/or hue of the image at each of the determined set of locations (e.g., the bottom-left of the first image). Further, based on the dominant background color of the each of the determined set of locations where the generated summary and headline are to be overlayed on the first image, the item generation engine 224 may automatically determine (i.e., select) a font color, contrasting a corresponding background color, for the generated summary and the generated headline. The font color for generated summary and the generated headline may be determined such that the readability of the generated summary and headline, overlaid on the determined set of locations, on the first image is enhanced. For example, the item generation engine 224 may be configured to maintain a lookup table that includes a list of contrasting color pairs. Based on the determination of the dominant background color of the each of the determined set of locations, the item generation engine 224 may access the lookup table to determine the font color(s) that is/are in contrast with the dominant background color. In another example, the item generation engine 224 may include, therein, a machine learning model that is trained to represent each color or hue as a unique vector in an n-dimensional embedding space. The machine learning model may determine that two colors are contrasting colors if a distance (e.g., a cosine distance or a Euclidian distance) between the two colors exceeds a pre-determined color threshold. The determined font color and the determined set of locations constitute the layout for displaying the generated summary, the generated headline, and the first images.

Further, the item generation engine 224 may determine a length of each of the generated summary and the generated headline. The length of the generated summary may correspond to a count of characters (e.g., alphabets, numbers, or special characters) or words in the generated summary. Similarly, the length of the generated headline may correspond to a count of characters or words in the generated headline.

The item generation engine 224 may select a font size for the summary and the headline based on the length of each of the generated summary and the generated headline. Different font sizes may be selected for the summary and the headline. However, for the sake brevity, it is assumed that a single font size is selected for both the summary and the headline. The item generation engine 224 may select the font size, based on various considerations such as, but not limited to, readability of the font size, user device attributes of various user devices, or the like. User device attributes of a user device may include, but is not limited to, a screen size of a screen of the user device, an aspect ratio of the screen of the user device, a resolution of the screen of the user device, or the like.

The item generation engine 224 may split the corresponding generated summary and/or the generated headline into multi-line text based on the determined lengths of the generated summary and the generated headline. For example, if the item generation engine 224 determines that the length of the generated summary exceeds a length threshold, the item generation engine 224 splits the generated summary into multi-line text (i.e., multiple lines). In case of multi-line text, the item generation engine 224 may also determine line breaks for displaying the summary and the headline. In some embodiments, the item generation engine 224, while determining the line breaks, may ensure that no line is occupied by just one word (i.e., orphan word). The determined font size and the multi-line text further constitute the layout for displaying the generated summary, the generated headline, and the set of images.

Further, the item generation engine 224 may process the set of images (i.e., the first through third images) based on a resolution and an aspect ratio of the first user device 104*a*. For example, the item generation engine 224 may upscale the first image from a first resolution (e.g., 1920×1080) to a second resolution (e.g., 4096×2160) for user devices (e.g., the first user device 104*a*) that support the second resolution. Further, the item generation engine 224 may adjust a transparency of each of the set of images so as to enhance the readability of the summary and the headline. In one embodiment, the item generation engine 224 may add a translucent layer to the first image to enhance the readability of the summary and the headline without compromising on visual aspects (e.g., color composition) of the first image.

In one embodiment, the application server 108, may further select, from a set of pre-designed templates stored in the memory 204, a template. Each template, of the set of pre-designed templates, may include one or more design elements such as, but not limited to, fancy borders, text boxes of various shapes and sizes for displaying text (e.g., summary and headline), background colors. In another embodiment, the item generation engine 224 may generate a new template for creating the multimedia item. The selected/generated template, the selected font size, the selected font style, the selected font color, the determined line breaks, the determined resolution for displaying the set of images, the level of transparency of the set of images, and the location for overlaying the summary and the headline may collectively constitute the determined set of presentation properties.

Consequently, the item generation engine 224 may create the multimedia item based on the determined set of presentation properties. In other words, the item generation engine 224 creates the multimedia item that has the generated summary and the generated headline overlayed on the first image of the selected set of images as per the determined set of presentation properties. In one embodiment, the item generation engine 224 creates a plurality of multimedia items (for the first story) to cater to user devices of various types. The determined set of presentation properties may differ for each of the plurality of multimedia items. For example, a first multimedia item, of the plurality of multimedia items, may be created for smartphones with a screen size of "6.1" inches, an aspect ratio of "13:9", and a resolution of "1920×1080". Similarly, a second multimedia item, of the plurality of multimedia items, may be created for tablets with a screen size of "11" inches, an aspect ratio of "1.43:1", and a resolution of "2388×1668". However, for the sake brevity, it is assumed that a single multimedia item is created in the current embodiment.

In another embodiment, the item generation engine 224 may also overlay, on the first image, a set of stickers or logos pertaining to the first story. For example, if the first story corresponds to a basketball match, a sticker or logo of a national basketball association (NBA) may be overlaid on the first image. The sticker or logo may be overlaid in a manner that avoids obscuring the detected set of objects in the first image. In another embodiment, the first image may not span an entirety of the created multimedia item (i.e., the first image may only comprise or constitute a portion of the created multimedia item). For example, a top-half of the created multimedia item may be composed of (i.e., occupied by) the first image. The item generation engine 224 may include, in a bottom-half of the multimedia item, a pattern (e.g., a dark and opaque gradient or a light gradient). The generated summary and the generated headline may be overlaid on the pattern to avoid obscuring the first image. In some scenarios, the pattern may match a dominant background color of the first image to aesthetically complement the first image. The item generation engine 224 may provide the created multimedia item to the recommendation engine 226 (as shown by arrow 316).

The recommendation engine 226 may retrieve, from the memory 204, the set of user preferences associated with the first user device 104a. The recommendation engine 226 may determine whether the set of user preferences aligns with the first story. For example, the recommendation engine 226 may predict a level of affinity of the first user 106a for the first story. If the determined level of affinity is greater than equal to a pre-determined affinity threshold, the recommendation engine 226 may render the multimedia item pertaining to the first story on the lock screen interface of the first user device 104a. In other words, the recommendation engine 226 renders (i.e., presents) the multimedia item on the lock screen interface of the first user device 104a when at least one of a category, a topic, and a language associated with the first story corresponds to the set of user preferences associated with the first user device 104a (as shown by arrow 318a). The created multimedia item is presented on the lock screen interface of the first user device 104a, displaying the summary, the headline, and the first image of the set of images. The presented multimedia item may further include the URL (i.e., hyperlink) to the first story. The URL to the first story may be represented by a "click here" or "swipe" option on the presented multimedia item. Upon selection of the URL (i.e., the "click here" or "swipe" option) by the first user 106a, the first story is presented to the first user 106a on the first user device 104a. In other words, a user interface (UI) of the first user device 104a may be redirected to a web page or an application that hosts the first story. The recommendation engine 226 may be further configured to store the presented multimedia item in the presentation history 228 (as shown by arrow 318b). The word and sentence embeddings associated with the presented multimedia item are also stored in the presentation history 228.

In some embodiments (e.g., in case of a new user), the application server 108 may not store any user preferences of the first user 106a. In such scenario, the recommendation engine 226 may predict the level of affinity of the first user 106a for the first story based on a location of the first user 106a, a seasonality factor, a time of day, prevalent trends, or the like.

The recommendation engine 226 may be further configured to periodically monitor the multimedia item presented on the lock screen interface of the first user device 104a. In an embodiment, the recommendation engine 226 may select another image (e.g., the second image) from the set of images if the URL on the lock screen interface remains unselected (by the first user 106a) by the end of a defined time-interval (e.g., "30" minutes). The recommendation engine 226 may replace the first image included in the multimedia item with the second image. The recommendation engine 226 may present the updated multimedia item, on the lock screen interface of the first user device 104a, displaying the summary, the headline, and the second image on the lock screen interface. In another embodiment, the recommendation engine 226 may replace the first image included in the multimedia item with the second image if the first user device 104a (i.e., a screen of the first user device 104a) is not activated (by the first user 106a) for a pre-defined time duration (e.g., "15" minutes).

In some embodiments, multiple multimedia items, corresponding to different stories of the second plurality of stories, may be presented on the lock screen interface of the first user device 104a. In a non-limiting example, the first user 106a may navigate or view the multiple multimedia items by scrolling on the lock screen interface of the first user device 104a. In another example, the multiple multimedia items may be presented, on the lock screen interface of the first user device 104a, in a clustered fashion, e.g., two multimedia items presented concurrently on the lock screen interface of the first user device 104a.

In an embodiment, the created multimedia item may be presented on the lock screen interfaces of various other user devices (e.g., the second user device 104b) in addition to the first user device 104a. The application server 108 may monitor the CTR of the first story by way of the service application running on the plurality of user devices 104. The content scoring and filtering engine 216 may determine using model interpretability techniques (e.g., Spearman correlation coefficient, Pearson correlation coefficient, or the like) a correlation between predicted CTR and actual CTR for the first story. If any deviation is observed between the predicted CTR and the actual CTR for the first story or other stories included in the second plurality of stories, the content scoring and filtering engine 216 may re-train the second machine learning model 238 to account for changes in trends, likes and dislike patterns with regards to various types of stories, or the like. For re-training the second machine learning model 238, the content scoring and filtering engine 216 may provide the actual CTR of the first story and the word and sentence embeddings associated with the first story as feedback to the second machine learning model 238. The second machine learning model 238 may learn the changes in trends, likes and dislike patterns based on the feedback.

Figure 4:
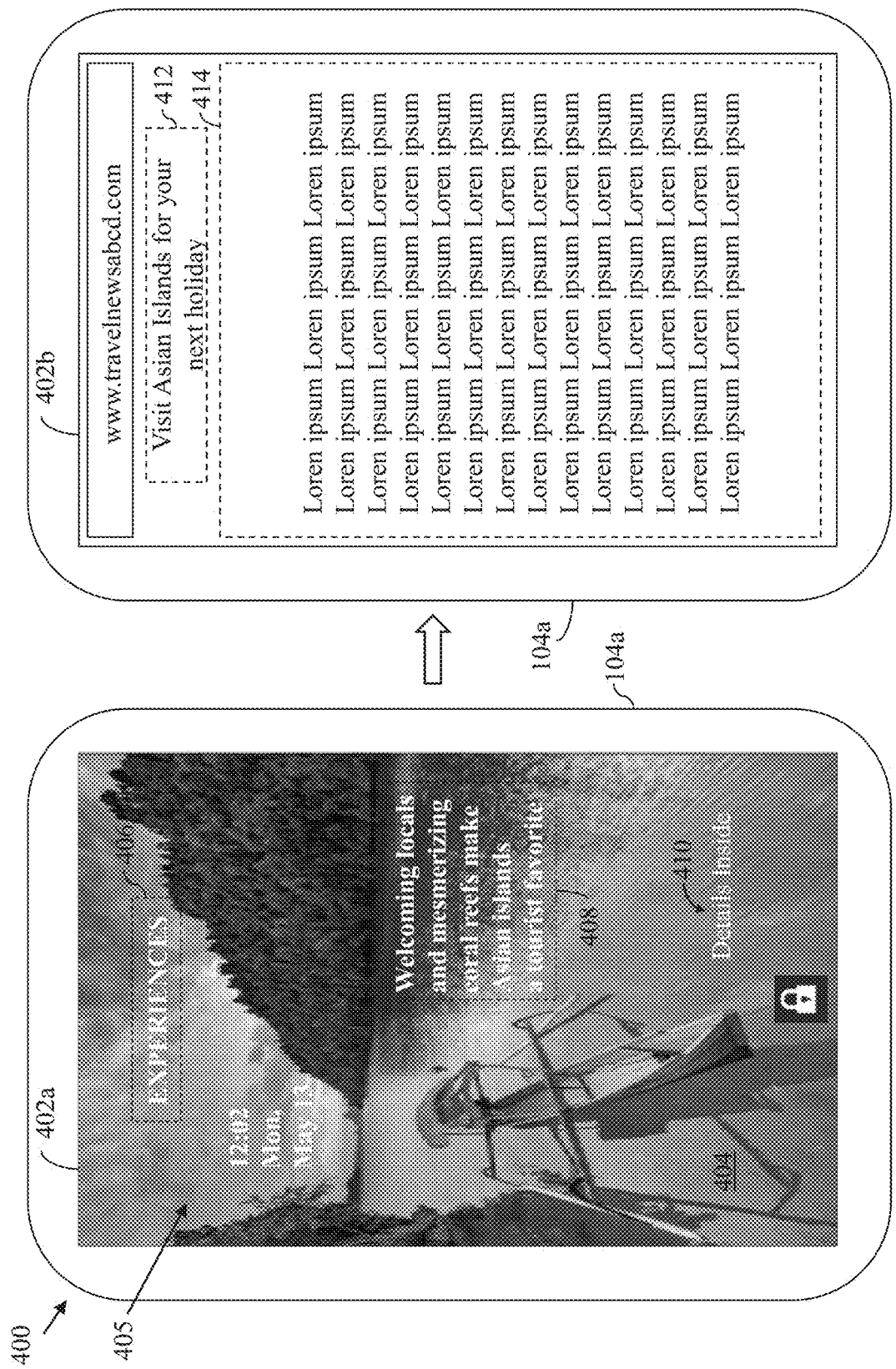
FIG. 4 is a block diagram that illustrates an exemplary scenario for presentation of a multimedia item on the user device, in accordance with an exemplary embodiment of the present disclosure.

FIG. 4 is a block diagram that illustrate an exemplary scenario for presentation of a multimedia item on the first user device, in accordance with an exemplary embodiment of the present disclosure. Referring to FIG. 4, there is shown an exemplary scenario 400 that illustrates a lock screen interface 402a of the first user device 104a. The multimedia item (hereinafter, referred to and designated as the multimedia item "404") is presented on the lock screen interface 402a of the first user device 104a. The multimedia item 404 includes the first image (hereinafter, "the first image 405") and a first textbox 406 that includes the generated headline (e.g., "Experiences") overlayed on the first image 405. The multimedia item 404 further includes a second textbox 408 that includes the generated summary (e.g., "Welcoming locals and mesmerizing coral reefs make Asian Islands a tourist favorite!") overlayed on the first image 405. The multimedia item 404 further includes a user-selectable option (i.e., "Details Inside") 410 for viewing the first story. Upon the selection of the user-selectable option 410, the lock screen interface 402a is redirected to a UI 402b of a corresponding content source (e.g., "travelnewsabcd.com"). The UI 402b includes third and fourth text boxes 412 and 414 that display the title and the description corresponding to the first story, respectively.

FIGS. 5A-5D, collectively represent a flowchart that illustrates a method for generating personalized content for presentation on a user device, in accordance with an exemplary embodiment of the present disclosure. Referring to FIGS. 5A-5D, there is shown a flowchart 500, which is described in conjunction with FIGS. 1-4.

Figure 5A:
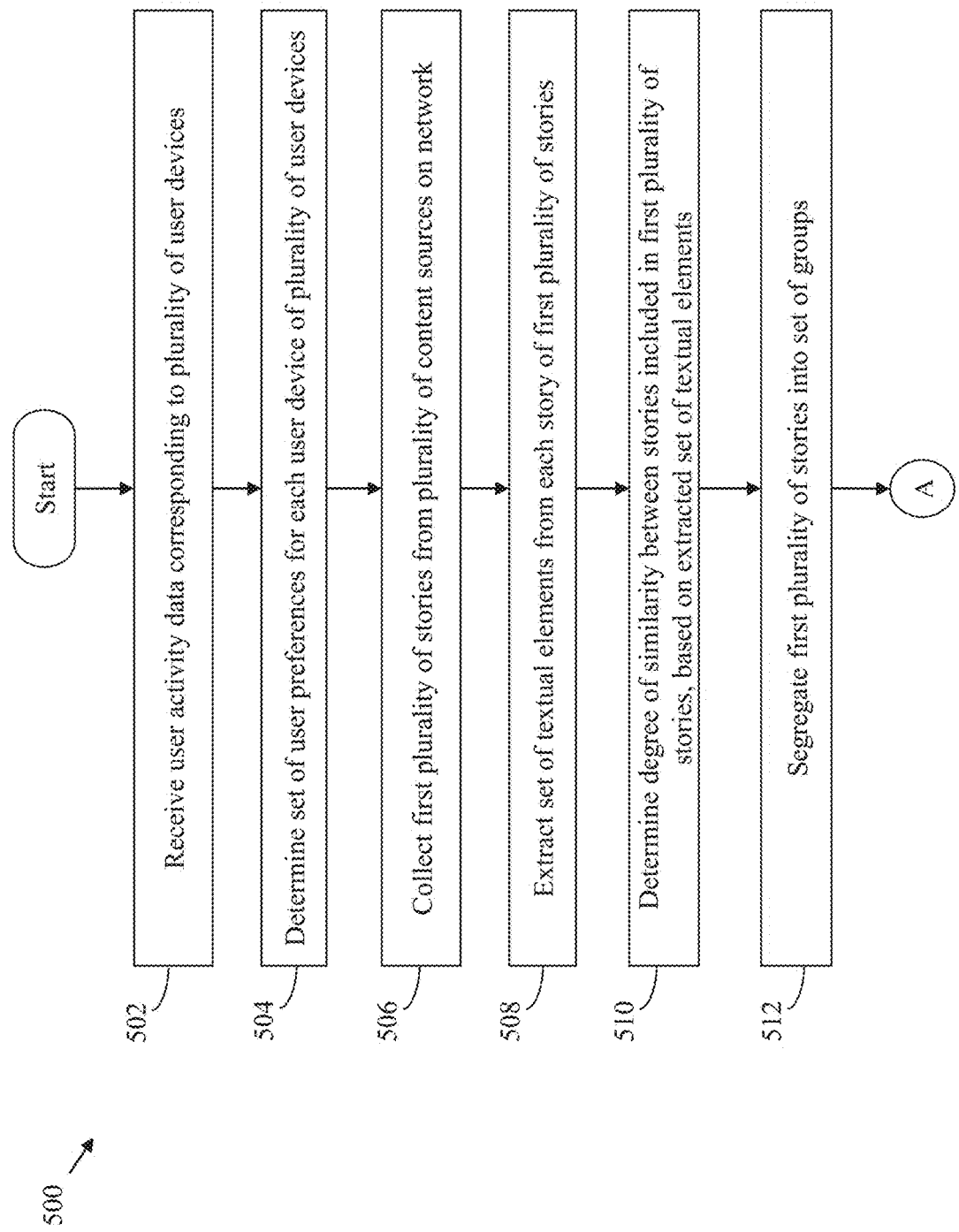
FIGS. 5A-5D, collectively, represent a flowchart that illustrates a method for generating personalized content for presentation on the user device, in accordance with an exemplary embodiment of the present disclosure.

With reference to FIG. 5A, at 502, the user activity data corresponding to the plurality of user devices 104 is received. The processor 210 receives the user activity data associated with the plurality of user devices 104. The user activity data associated with each user device is indicative of a corresponding social media history, a corresponding purchase history, a corresponding browsing history, or the like. At 504, the set of user preferences for each user device, of the plurality of user devices 104, is determined. Based on the user activity data associated with the plurality of user devices 104, the processor 210 determines the set of user preferences associated with each user device of the plurality of user devices 104. The set of user preferences associated with each user device includes a preferred category, a preferred topic, or a preferred language. At 506, the first plurality of stories is collected from the plurality of content sources 102 on the communication network 110. The story acquisition engine 212 collects the first plurality of stories from the plurality of content sources 102. At 508, the set of textual elements is extracted from each tory of the first plurality of stories. The de-duplication engine 214 extracts the set of textual elements from each of the first plurality of stories, as described in the foregoing description of FIG. 3. Based on the set of textual elements extracted from each of the first plurality of stories, the de-duplication engine 214 utilizes the first machine learning model 236 to determine the word and sentence embeddings corresponding to each story of the first plurality of stories. At 510, the degree of similarity between the stories included in the first plurality of stories is determined, based on the extracted set of textual elements. The de-duplication engine 214 determines the degree of similarity between the stories included in the first plurality of stories. At 512, the first plurality of stories are segregated into the set of groups. The de-duplication engine 214 segregates the first plurality of stories into the set of groups.

Figure 5B:
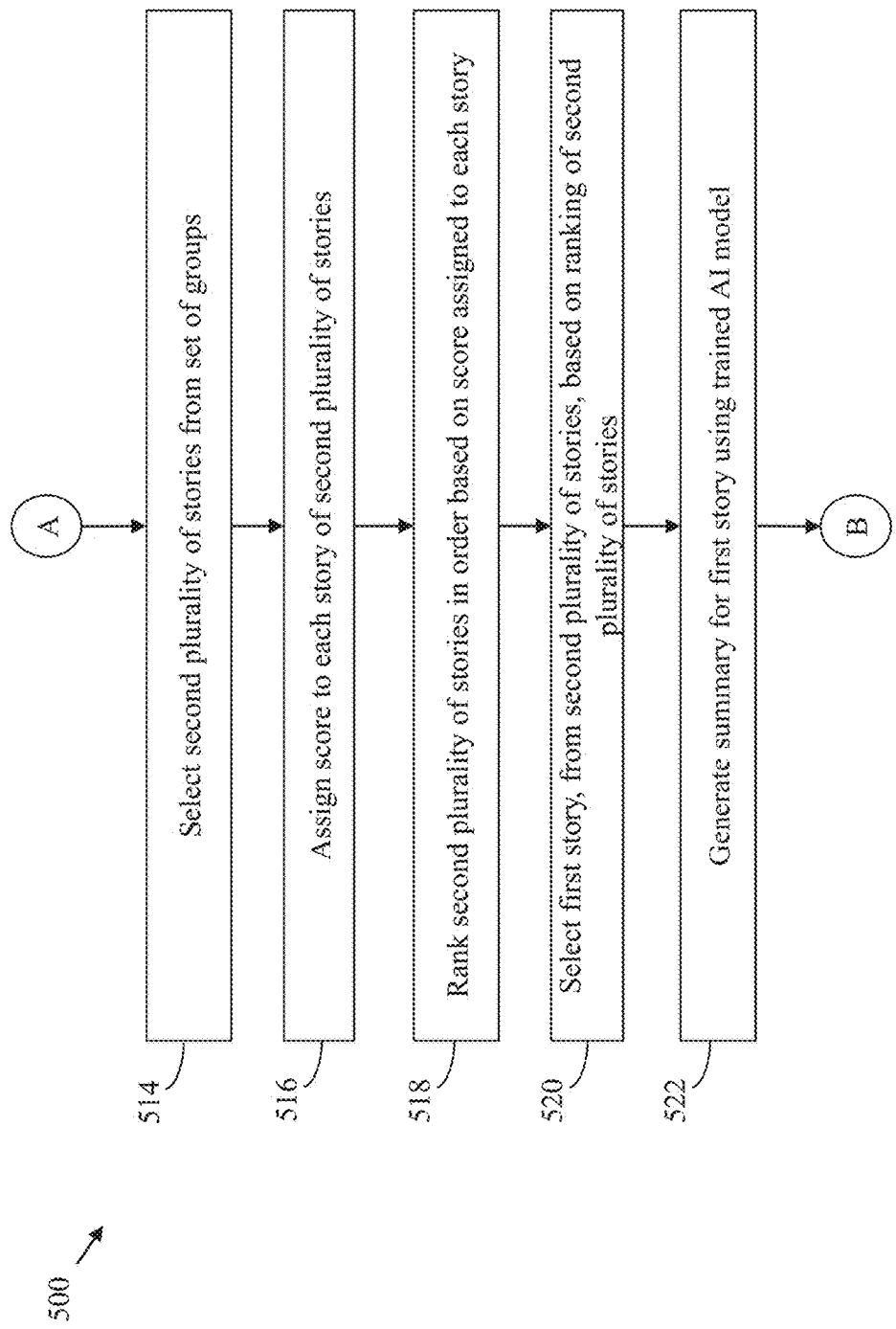

With reference to FIG. 5B, at 514, the second plurality of stories are selected from the set of groups. The de-duplication engine 214 selects the second plurality of stories from the set of groups. The selection of the second plurality of stories includes selecting one story from each group of the set of groups, as described in the foregoing description of FIG. 3. At 516, a score is assigned to each of the second plurality of stories. The content scoring and filtering engine 216 assigns a score to each story of the second plurality of stories based on the set of scoring rules 232 and the set of filtering criteria 234. At 518, the second plurality of stories are ranked in an order, based on the score assigned to each story. The content scoring and filtering engine 216 ranks the second plurality of stories in an order, based on the score assigned to each story of the second plurality of stories. At 520, the first story is selected from the second plurality of stories, based on the ranking of the second plurality of stories. The content scoring and filtering engine 216 selects the first story, from the second plurality of stories, for the creation of the multimedia item 404, based on the ranking of the second plurality of stories. At 522, the summary is generated for the first story using the third machine learning model 240. The text summarization engine 218 generates the summary for the first story using the third machine learning model 240 (as described in the foregoing description of FIG. 3).

Figure 5C:
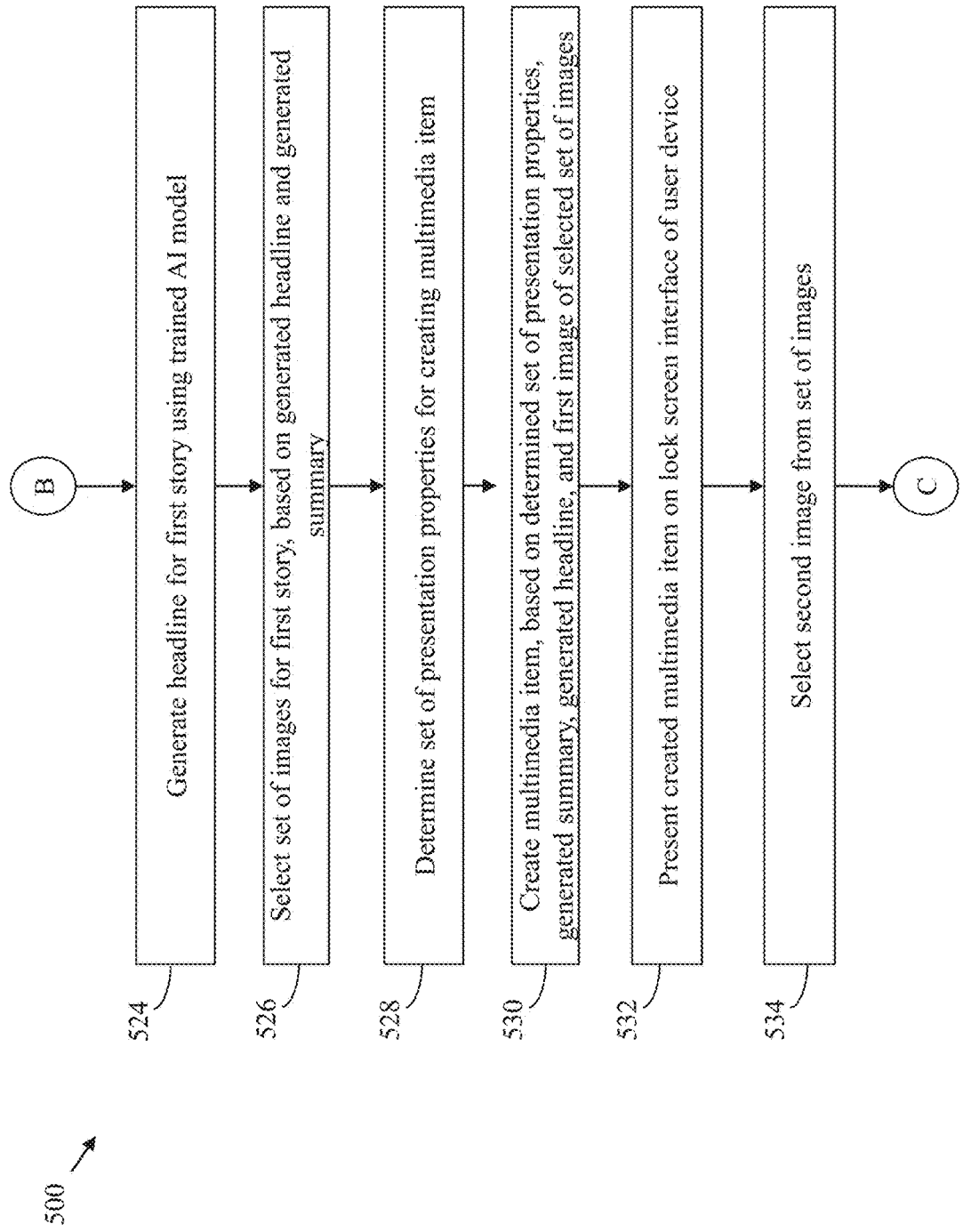

With reference to FIG. 5C, at 524, the headline is generated for the first story using the fourth machine learning model 242. The headline generation engine 220 generates the headline for the first story using the fourth machine learning model 242 (as described in the foregoing description of FIG. 3). At 526, the set of images is selected for the first story, based on the generated headline and the generated summary. The image selection engine 222 selects the set of images for the first story, based on the generated headline and the generated summary. At 528, the set of presentation properties for creating the multimedia item 404 is determined. The item generation engine 224 determines the set of presentation properties (e.g., font style, font size, layout) for creating the multimedia item 404. At 530, the multimedia item 404 is created, based on the determined set of presentation properties, the generated summary, the generated headline, and the first image 405 of the selected set of images. The item generation engine 224 creates the multimedia item 404 based on the set of presentation properties, the generated summary, the generated headline, and the first image 405 of the set of images. At 532, the created multimedia item 404 is presented on the lock screen interface 402a of the first user device 104a. The recommendation engine 226 presents, based on the set of user preferences associated with the first user device 104a, the multimedia item 404 on the lock screen interface 402a of the first user device 104a. The created multimedia item 404 is presented on the lock screen interface 402a of the first user device 104a when at least one of the category, the topic, and the language associated with the first story corresponds to the set of user preferences associated with the first user device 104a. Therefore, the first image 405, the generated headline, and the generated summary are displayed on the lock screen interface 402a of the first user device 104a by way of the multimedia item 404. At 534, the second image is selected from the set of images. The recommendation engine 226 selects the second image of the set of images.

Figure 5D:
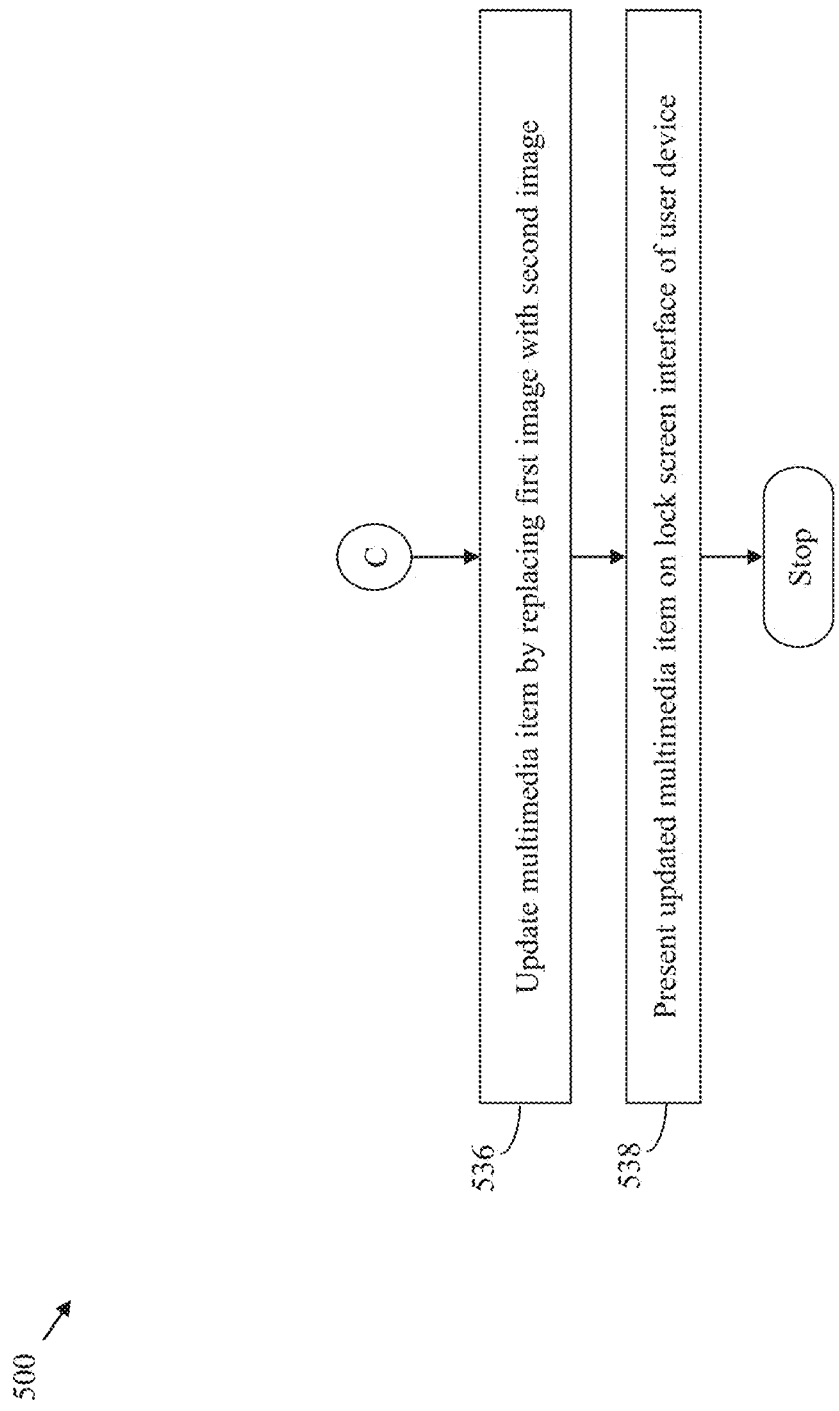

With reference to FIG. 5D, at 536, the multimedia item 404 is updated by replacing the first image 405 with the second image. The recommendation engine 226 updates the multimedia item 404 by replacing the first image 405 with the second image. At 538, the updated multimedia item is presented on the lock screen interface 402a of the first user device 104a. The recommendation engine 226 presents the updated multimedia item on the lock screen interface 402a of the first user device 104a, displaying the second image, the generated headline, and the generated summary on the lock screen interface 402a.

FIG. 6 represents a flowchart that illustrates a method for determining the layout for displaying the generated summary, the generated headline, and the set of images, in accordance with an exemplary embodiment of the present disclosure. Referring to FIG. 6, there is shown a flowchart 600 which is explained in conjunction with FIG. 2.

At 602, the set of objects is detected in the first image 405. The item generation engine 224 detects the set of objects in the first image 405, based on the set of image processing techniques. At 604, the set of locations on the first image 405 for overlaying the generated headline and the generated summary is determined, based on the detected set of objects in the first image 405. The item generation engine 224 determines based on the detected set of objects, the set of locations on the first image 405 for overlaying the generated headline and the generated summary. At 606, the background color of the first image 405 at each of the determined set of locations is identified. The item generation engine 224 identifies the background color (i.e., dominant background color) at each of the determined set of locations. At 608, the font color for displaying the generated summary and the generated headline on the determined set of locations is determined. The item generation engine 224 determines a font color for displaying the generated summary and the generated headline on the determined set of locations. At 610, the length of each of the generated summary and the generated headline is determined. The item generation engine 224 determines the length of each of the generated summary and the generated headline. The determination of the lengths of the generated summary and the generated headline is based on the count of characters in the generated summary and the generated headline, respectively. At 612, the font size for displaying each of the generated summary and the generated headline on the determined set of locations is determined based on the lengths of the generated summary and the generated headline. The item generation engine 224 determines, based on the lengths of the generated summary and the generated headline, the font size for displaying each of the generated summary and the generated headline on the determined set of locations. At 614, the generated summary is split into multi-line text, based on the determined length of the generated summary. The item generation engine 224 splits the generated summary into multi-line text, based on the determined length of the generated summary.

FIG. 7 represents a high-level flowchart that illustrates a method for generating personalized content for presentation on a user device, in accordance with an exemplary embodiment of the present disclosure. Referring to FIG. 7, there is shown a flowchart 700.

At 702, the first plurality of stories are collected from the plurality of content sources 102. The story acquisition engine 212 collects the first plurality of stories from the plurality of content sources 102. At 704, the second plurality of stories is selected from the first plurality of stories. The de-duplication engine 214 selects the second plurality of stories from the first plurality of stories. At 706, the summary and the headline are generated for the first story of the second plurality of stories. The text summarization engine 218 and the headline generation engine 220 generate the summary and the headline for the first story of the second plurality of stories. At 708, the set of images for the first story is selected, based on the generated summary and the generated headline. The image selection engine 222 selects the set of images for the first story, based on the generated summary and the generated headline. At 710, the set of presentation properties is determined. The item generation engine 224 determines the set of presentation properties for displaying the generated summary, the generated headline, and the set of images. At 712, the multimedia item 404 that includes the generated summary, the generated headline, and the first image 405 of the selected set of images is created. The item generation engine 224 creates the multimedia item 404 that includes the generated summary, the generated headline, and the first image 405 of the selected set of images. At 714, the created multimedia item 404 is presented on the lock screen interface 402a of the first user device 104a, displaying the generated summary, the generated headline, and the first image 405 on the lock screen interface 402a. The recommendation engine 226 presents the created multimedia item 404 on the lock screen interface 402a, thereby displaying the generated summary, the generated headline, and the first image 405 on the lock screen interface 402a.

Figure 8:
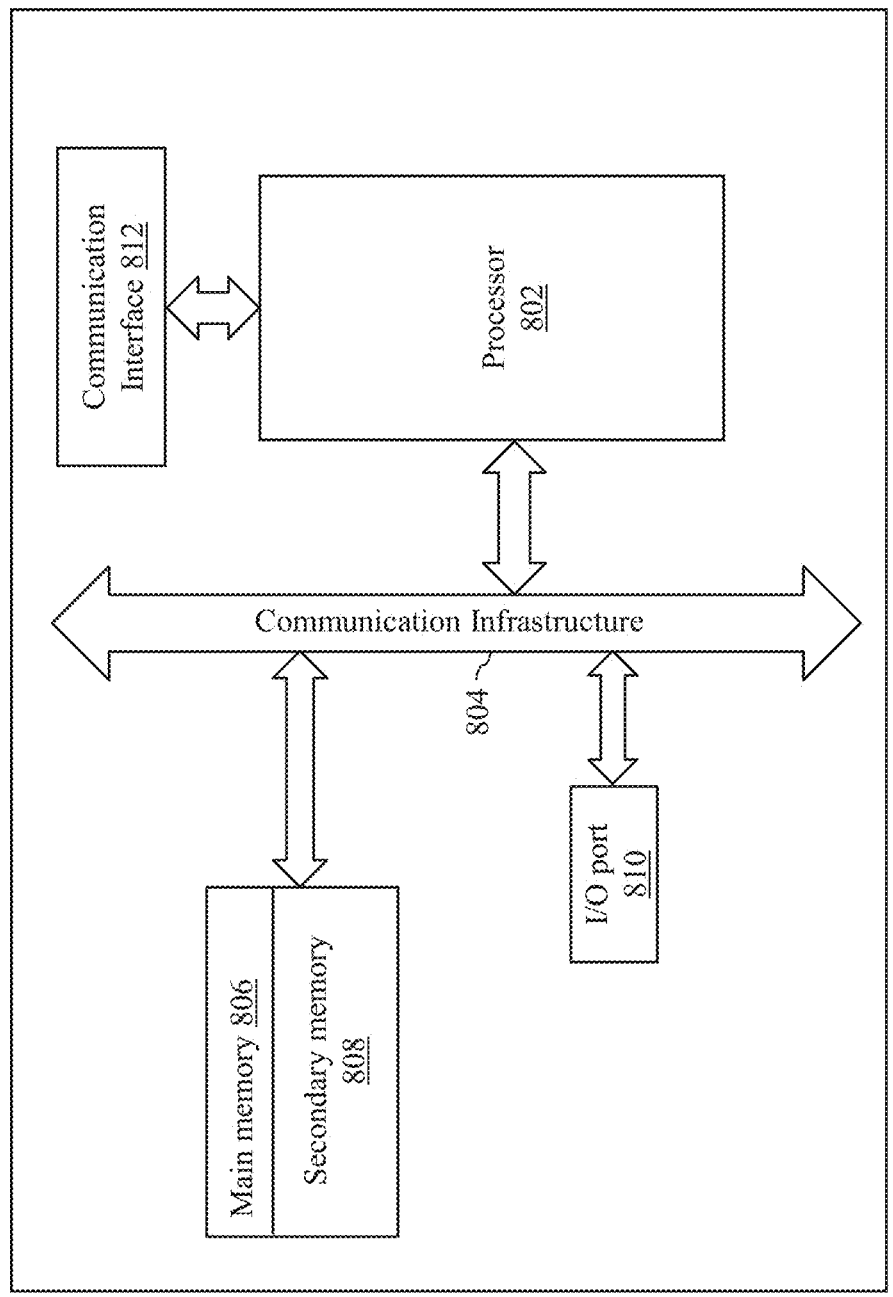
FIG. 8 is a block diagram that illustrates a system architecture of a computer system, in accordance with an embodiment of the present disclosure.

FIG. 8 is a block diagram that illustrates a system architecture of a computer system, in accordance with an embodiment of the present disclosure. Referring to FIG. 8, there is shown a block diagram of the computer system 800. An embodiment of the present disclosure, or portions thereof, may be implemented as computer readable code on the computer system 800. In one example, the plurality of content sources 102, the plurality of user devices 104, and the application server 108 may be implemented as the computer system 800. Hardware, software, or any combination thereof may embody modules and components used to implement the methods of FIGS. 5A-5D, 6, and 7.

The computer system 800 includes a CPU 802 that may be a special-purpose or a general-purpose processing device. The CPU 802 may be a single processor, multiple processors, or combinations thereof. The CPU 802 may have one or more processor cores. Further, the CPU 802 may be connected to a communication infrastructure 804, such as a bus, message queue, multi-core message-passing scheme, and the like. The computer system 800 may further include a main memory 806 and a non-transitory computer-readable medium 808. Examples of the main memory 806 may include RAM, ROM, and the like. The non-transitory computer-readable medium 808 may include a hard disk drive or a removable storage drive, such as a floppy disk drive, a magnetic tape drive, a compact disc, an optical disk drive, a flash memory, and the like. The non-transitory computer-readable medium 808 may be configured to store thereon, computer executable instructions, which when executed by the processor 802, cause the processor 802 to execute operations for digital content generation and recommendation in accordance with an embodiment of the present disclosure.

The computer system 800 further includes an input/output (I/O) interface 810 and a communication interface 812. The I/O interface 810 includes various input and output devices that are configured to communicate with the CPU 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communication port, and the like. Data transferred via the communication interface 812 may correspond to signals, such as electronic, electromagnetic, optical, or other signals as will be apparent to a person skilled in the art.

Various embodiments of the disclosure provide the application server 108 for digital content generation and recommendation. The application server 108 may be configured to collect the first plurality of stories from the plurality of content sources 102 on the communication network 110. The application server 108 may be further configured to select, from the first plurality of stories, the second plurality of stories such that the degree of similarity between any two stories of the second plurality of stories is below the determined threshold. The application server 108 may be further configured to select, from the plurality of images stored in the image database 230, the set of images for the first story based on the generated summary and the generated headline. The application server 108 determines the set of presentation properties. The set of presentation properties includes at least one of the font style and the layout for displaying the generated summary, the generated headline, and the set of images. The determination of the font style is based on at least one of the category, the topic, and the language associated with the first story. The application server 108 may be further configured to present, on the lock screen interface of the first user device 104a, the created multimedia item 404, displaying the generated summary, the generated headline, and the first image 405 on the lock screen interface 402a, in accordance with the determined set of presentation properties.

Various embodiments of the disclosure provide a non-transitory computer-readable medium 808 having stored thereon, computer executable instructions, which when executed by a computer, cause the computer to execute operations for digital content generation and recommendation. The operations include collecting, by the application server, the first plurality of stories from the plurality of content sources 102 on the network. The operations further include selecting, by the application server 108, from the first plurality of stories, the second plurality of stories such that the degree of similarity between any two stories of the second plurality of stories is below the determined threshold. The operations further include generating, by the application server 108, the summary and the headline for the first story of the second plurality of stories. The operations further include selecting, by the application server 108, from the plurality of images stored in the image database 230, the set of images for the first story based on the generated summary and the generated headline. The operations further include determining, by the application server 108, the set of presentation properties. The set of presentation properties includes at least one of the font style and the layout for displaying the generated summary, the generated headline, and the set of images. The determination of the font style is based on at least one of the category, the topic, and the language associated with the first story. The operations further include presenting, by the application server 108, on the lock screen interface 402a of the first user device 104a, the created multimedia item 404, displaying the generated summary, the generated headline, and the first image 405 on the lock screen interface 402a, in accordance with the determined set of presentation properties.

The environment 100 of FIG. 1 enables the application server 108 to generate content for presentation on the lock screen interface 402a of the first user device 104a without any manual intervention. The application server 108 identifies the set of user preferences associated with the first user device 104a and determines an interaction history of the previously presented set of multimedia items. The application server 108 leverages machine learning (i.e., artificial intelligence or AI) to identify stories conforming to the set of user preferences associated with the first user device 104a, enabling presentation of personalized (i.e., curated) stories or content on the first user device 104a. Owing to completely autonomous operation, the application server 108 may access quickly and efficiently multiple (e.g., thousand, tens of thousands, or the like) content sources (e.g., the plurality of content sources 102) for collecting stories, enabling the application server 108 to always collect the latest content or stories for presentation on the plurality of user devices 104. The application server 108 identifies and removes duplicate stories, enabling presentation of content that is always new. Further, the removal of duplicate stories or content increases an efficiency or efficacy of memory management in the application server 108. A high level of engagement of the first user 106a with the presented personalized content (i.e., the first story) is guaranteed, owing to the personalized nature of the presented content or stories. Entire process of presentation of the personalized content (e.g., from collecting the first plurality of stories to removing duplicate stories to presentation of the first story on the lock screen interface 402a) is completely automated by AI and requires no manual input. In contrast to conventional news generators or aggregators, the application server 108 does not require any human provide or curate stories or content. This leads to a highly streamlined and efficient process for delivering personalized content to users. The lack of manual input also allows for a large number of multimedia items (i.e., large amount of personalized content) to be created and presented (i.e., high throughput) to users. The application server 108 includes comprehensive safety mechanisms that prevent inappropriate or suggestive content from being presented on the first user device 104a.

Techniques consistent with the present disclosure provide, among other features, systems and methods for generating personalized content for presentation on user devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for digital content generation and recommendation, the method comprising:
   collecting, by a server, a first plurality of stories from a plurality of content sources on a network;
   selecting, by the server, from the first plurality of stories, a second plurality of stories such that a degree of similarity between any two stories of the second plurality of stories is below a determined threshold;
   generating, by the server, a summary and a headline for a first story of the second plurality of stories;
   selecting, by the server, from a plurality of images stored in an image database, a set of images for the first story based on the generated summary and the generated headline;
   determining, by the server, a set of presentation properties, wherein the set of presentation properties includes at least one of a font style and a layout for displaying the generated summary, the generated headline, and the set of images, and wherein the determination of the font style is based on at least one of a category, a topic, and a language associated with the first story;
   creating, by the server, based on the determined set of presentation properties, a multimedia item that includes the generated summary, the generated headline, and a first image of the set of images;
   training a first machine learning model for headline generation, wherein the machine learning model is trained based on a training dataset including a description of each of a set of sample stories, and a headline of each of the set of sample stories;
   providing, by the server, as input to the trained machine learning model, a description of the first story, wherein the headline for the first story is generated based on an output of the trained machine learning model for the inputted description of the first story;
   presenting, by the server, on the lock screen interface of the user device, the created multimedia item, displaying the generated summary, the generated headline, and the first image on the lock screen interface, in accordance with the determined set of presentation properties;

training a second machine learning model to predict a predicted click-through rate (CTR) of the first story based on word and sentence embeddings associated with the first story;

determining an actual CTR of the first story;

determining when a deviation occurs between the predicted CRT and the actual CRT; and when the deviation occurs between the predicted CRT and the actual CRT occurs, retraining the second machine learning model based on changes in user interaction patterns associated with the first story.

2. The method for digital content generation and recommendation of claim 1, wherein the multimedia item further includes a hyperlink to the first story, and wherein, upon selection of the hyperlink, the first story is presented on the user device.

3. The method for digital content generation and recommendation of claim 1, further comprising identifying, by the server, a set of user preferences associated with the user device, wherein the set of user preferences includes at least one of a preferred category, a preferred topic, and a preferred language, and wherein the created multimedia item is presented on the lock screen interface of the user device when at least one of a category, a topic, and a language associated with the first story corresponds to the set of user preferences.

4. The method for digital content generation and recommendation of claim 1, further comprising:
assigning, by the server, a score to each of the selected second plurality of stories based on an interaction history of a plurality of users with a set of multimedia items previously presented on a plurality of user devices of the plurality of users;
ranking, by the server, the second plurality of stories in an order, based on the score assigned to each story of the second plurality of stories; and
selecting, by the server, the first story based on the ranking of the second plurality of stories for the creation of the multimedia item.

5. The method for digital content generation and recommendation of claim 1, further comprising:
extracting, by the server, from each of the first plurality of stories, a set of textual elements, wherein the set of textual elements extracted from each of the first plurality of stories includes at least one of a title, a description, a category, and a language of a corresponding story;
determining, by the server, the degree of similarity between stories of the first plurality of stories based on the set of textual elements extracted from each of the first plurality of stories; and
segregating, by the server, the first plurality of stories into a set of groups based on the determined degree similarity between the stories of the first plurality of stories, wherein the degree of similarity between any two stories segregated into a same group is above the determined threshold, wherein the degree of similarity between any two stories segregated into different groups is below the determined threshold, and wherein the selection of the second plurality of stories from the first plurality of stories includes selecting one story from each of the set of groups.

6. The method for digital content generation and recommendation of claim 1, further comprising:
training, by the server, a machine learning model for summary generation, wherein the machine learning model is trained based on a training dataset including a description of each of a set of sample stories and a summary of each of the set of sample stories; and
providing, by the server, as input to the trained machine learning model, a description of the first story, wherein the summary for the first story is generated based on an output of the trained machine learning model for the inputted description of the first story.

7. The method for digital content generation and recommendation of claim 1, wherein each image of the plurality of images stored in the image database is associated with a set of keywords, and wherein the selection of the set of images for the first story is further based on a degree of similarity between the set of keywords, associated with each of the plurality of images, and the generated summary or the generated headline.

8. The method for digital content generation and recommendation of claim 1, further comprising:
selecting, by the server, a second image from the set of images; and
updating, by the server, the multimedia item by replacing the first image included in the multimedia item with the second image, wherein after a defined time-interval, the updated multimedia item is presented on the lock screen interface of the user device, displaying the generated summary, the generated headline, and the second image on the lock screen interface.

9. The method for digital content generation and recommendation of claim 1, further comprising:
detecting, by the server, based on a set of image processing techniques, a set of objects in the first image;
determining, by the server, based on the detected set of objects in the first image, a set of locations on the first image for overlaying the generated headline and the generated summary;
identifying, by the server, a background color of the first image at each of the determined set of locations; and
determining, by the server, a font color for displaying the generated summary and the generated headline on the determined set of locations, wherein the determined font color and the determined set of locations constitute the layout for displaying the generated summary, the generated headline, and the set of images.

10. The method for digital content generation and recommendation of claim 9, further comprising:
determining, by the server, a length of each of the generated summary and the generated headline, wherein the determination of the lengths of the generated summary and the generated headline is based on a count of characters in the generated summary and the generated headline, respectively;
determining, by the server, based on the lengths of the generated summary and the generated headline, a font size for displaying each of the generated summary and the generated headline on the determined set of locations; and
splitting, by the server, the generated summary into multi-line text, based on the determined length of the generated summary, wherein the determined font size and the multi-line text further constitute the layout for displaying the generated summary, the generated headline, and the set of images.

11. The method for digital content generation and recommendation of claim 1, further comprising:
determining, by the server, a length of each of the generated summary and the generated headline, wherein the determination of the lengths of the generated summary and the generated headline is based on a count of characters in the generated summary and the generated headline, respectively;

determining, by the server, based on the lengths of the generated summary and the generated headline, a font size for displaying each of the generated summary and the generated headline on the determined set of locations; and splitting, by the server, the generated summary into multi-line text, based on the determined length of the generated summary, wherein the determined font size and the multi-line text further constitute the layout for displaying the generated summary, the generated headline, and the set of images.

12. A system for digital content generation and recommendation, the system comprising:

a server configured to:

collect a first plurality of stories from a plurality of content sources on a network;

select, from the first plurality of stories, a second plurality of stories such that a degree of similarity between any two stories of the second plurality of stories is below a determined threshold;

generate a summary and a headline for a first story of the second plurality of stories;

select, from a plurality of images stored in an image database, a set of images for the first story based on the generated summary and the generated headline;

determine, a set of presentation properties, wherein the set of presentation properties includes at least one of a font style and a layout for displaying the generated summary, the generated headline, and the set of images, and wherein the determination of the font style is based on at least one of a category, a topic, and a language associated with the first story;

create, based on the determined set of presentation properties, a multimedia item that includes the generated summary, the generated headline, and a first image of the set of images; and training a first machine learning model for headline generation, wherein the first machine learning model is trained based on a training dataset including a description of each of a set of sample stories, and a headline of each of the set of sample stories;

providing, by the server, as input to the trained machine learning model, a description of the first story, wherein the headline for the first story is generated based on an output of the trained machine learning model for the inputted description of the first story;

present, on a lock screen interface of a user device, the created multimedia item, displaying the generated summary, the generated headline, and the first image on the lock screen interface, in accordance with the determined set of presentation properties;

training a second machine learning model to predict a predicted click-through rate (CTR) of the first story based on word and sentence embeddings associated with the first story;

determining an actual CTR of the first story;

determining when a deviation occurs between the predicted CRT and the actual CRT; and when the deviation occurs between the predicted CRT and the actual CRT occurs, retraining the second machine learning model to account for changes in user interaction patterns associated with the first story.

13. The system for digital content generation and recommendation of claim 12, wherein the multimedia item further includes a hyperlink to the first story, and wherein, upon selection of the hyperlink, the first story is presented on the user device.

14. The system for digital content generation and recommendation of claim 12, wherein the server is further configured to identify a set of user preferences associated with the user device, wherein the set of user preferences includes at least one of a preferred category, a preferred topic, and a preferred language, and wherein the created multimedia item is presented on the lock screen interface of the user device when at least one of a category, a topic, and a language associated with the first story corresponds to the set of user preferences.

15. The system for digital content generation and recommendation of claim 12, wherein the server is further configured to:

assign a score to each of the selected second plurality of stories based on an interaction history of a plurality of users with a set of multimedia items previously presented on a plurality of user devices of the plurality of users;

rank the second plurality of stories in an order, based on the score assigned to each story of the second plurality of stories; and select the first story based on the ranking of the second plurality of stories for the creation of the multimedia item.

16. The system for digital content generation and recommendation of claim 12, wherein the server is further configured to:

extract, from each of the first plurality of stories, a set of textual elements, and wherein the set of textual elements extracted from each of the first plurality of stories includes at least one of a title, a description, a category, and a language of a corresponding story;

determine the degree of similarity between stories of the first plurality of stories based on the set of textual elements extracted from each of the first plurality of stories; and segregate the first plurality of stories into a set of groups based on the determined degree similarity between the stories of the first plurality of stories, wherein the degree of similarity between any two stories segregated into a same group is above the determined threshold, and wherein the degree of similarity between any two stories segregated into different groups is below the determined threshold, and wherein the selection of the second plurality of stories from the first plurality of stories includes selection of one story from each of the set of groups.

17. The system for digital content generation and recommendation of claim 12, wherein the server is configured to:

train a machine learning model for summary generation, and wherein the machine learning model is trained based on a training dataset that includes a description of each of a set of sample stories and a summary of each of the set of sample stories; and provide, as input to the trained machine learning model, a description of the first story, and wherein the summary for the first story is generated based on an output of the trained machine learning model for the inputted description of the first story.

18. The system for digital content generation and recommendation of claim 12, wherein each image of the plurality of images stored in the image database is associated with a set of keywords, and wherein the selection of the set of images for the first story is further based on a degree of similarity between the set of keywords, associated with each of the plurality of images, and the generated summary or the generated headline.

19. The system for digital content generation and recommendation of claim 12, wherein the server is further configured to:
- detect, based on a set of image processing techniques, a set of objects in the first image;
- determine, based on the detected set of objects in the first image, a set of locations on the first image for overlaying the generated headline and the generated summary;
- identify a background color of the first image at each of the determined set of locations; and
- determine a font color for displaying each of the generated summary and the generated headline on the determined set of locations, wherein the determined font color and the determined set of locations constitute the layout for displaying the generated summary, the generated headline, and the set of images.

20. The system for digital content generation and recommendation of claim 12, wherein the server is further configured to:
- determine a length of each of the generated summary and the generated headline, wherein the determination of the lengths of the generated summary and the generated headline is based on a count of characters in the generated summary and the generated headline, respectively;
- determine, based on the lengths of the generated summary and the generated headline, a font size for displaying each of the generated summary and the generated headline on the determined set of locations; and
- split the generated summary into multi-line text, based on the determined length of the generated summary, wherein the determined font size and the multi-line text further constitute the layout for displaying the generated summary, the generated headline, and the set of images.

* * * * *